United States Patent
Zhao et al.

(10) Patent No.: US 10,152,243 B2
(45) Date of Patent: Dec. 11, 2018

(54) MANAGING DATA FLOW IN HETEROGENEOUS COMPUTING

(71) Applicant: QUALCOMM Incorporated, San Diego, CA (US)

(72) Inventors: Han Zhao, Santa Clara, CA (US); Arun Raman, San Francisco, CA (US); Aravind Natarajan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 15/266,656

(22) Filed: Sep. 15, 2016

(65) Prior Publication Data

US 2018/0074727 A1   Mar. 15, 2018

(51) Int. Cl.
*G06F 12/00* (2006.01)
*G06F 13/00* (2006.01)
(Continued)

(52) U.S. Cl.
CPC .......... *G06F 3/0613* (2013.01); *G06F 3/0631* (2013.01); *G06F 3/0656* (2013.01);
(Continued)

(58) Field of Classification Search
CPC ............ G06F 3/00; G06F 3/06–3/0613; G06F 3/0614–3/0631; G06F 3/0632–3/0656;
(Continued)

(56) References Cited

U.S. PATENT DOCUMENTS

| 7,577,792 | B2 * | 8/2009 | Hady | G06F 15/167 711/130 |
| 8,176,282 | B2 * | 5/2012 | Bouvier | G06F 12/084 711/124 |

(Continued)

OTHER PUBLICATIONS

Data Coherence Analysis and Optimization for Heterogeneous Computing; Sousa et al.; 29th International Symposium on Computer Architecture and High Performance Computing; Oct. 17-20, 2017 (Year: 2017).*

(Continued)

*Primary Examiner* — Daniel C Chappell
(74) *Attorney, Agent, or Firm* — The Marbury Law Group/Qualcomm

(57) ABSTRACT

Embodiments include computing devices, apparatus, and methods implemented by the apparatus for implementing data flow management on a computing device. Embodiment methods may include initializing a buffer partition of a first memory of a first heterogeneous processing device for an output of execution of a first iteration of a first operation by the first heterogeneous processing device on which a first iteration of a second operation assigned for execution by a second heterogeneous processing device depends. Embodiment methods may include identifying a memory management operation for transmitting the output by the first heterogeneous processing device from the buffer partition as an input to the second heterogeneous processing device. Embodiment methods may include allocating a second memory for storing data for an iteration executed by a third heterogeneous processing device to minimize a number of memory management operations for the second allocated memory.

26 Claims, 12 Drawing Sheets

(51) Int. Cl.
  *G06F 13/28* (2006.01)
  *G06F 3/06* (2006.01)
  *G06F 12/0811* (2016.01)
  *G06F 12/084* (2016.01)
  *G06F 12/0855* (2016.01)
  *G06F 9/52* (2006.01)
  *G06F 9/54* (2006.01)

(52) U.S. Cl.
  CPC .............. *G06F 3/0685* (2013.01); *G06F 9/52* (2013.01); *G06F 9/544* (2013.01); *G06F 12/084* (2013.01); *G06F 12/0811* (2013.01); *G06F 12/0855* (2013.01); *G06F 2212/283* (2013.01); *G06F 2212/314* (2013.01)

(58) Field of Classification Search
  CPC . G06F 3/0658–3/0685; G06F 3/0686–3/0689; G06F 5/06; G06F 5/065; G06F 7/00; G06F 7/76–7/785; G06F 9/50–9/5094; G06F 12/02; G06F 12/08–12/0811; G06F 12/0813–12/084; G06F 12/0842–12/0855; G06F 12/0857–12/0897; G06F 2003/0691–2003/0698; G06F 2212/00–2212/7211
  See application file for complete search history.

(56) References Cited

U.S. PATENT DOCUMENTS

| | | | |
|---|---|---|---|
| 8,937,622 B2 | 1/2015 | Bourd et al. | |
| 8,957,906 B2 | 2/2015 | Munshi et al. | |
| 9,043,770 B2 | 5/2015 | Aliseychik et al. | |
| 9,697,124 B2* | 7/2017 | Park | G06F 12/0806 |
| 9,836,369 B2 | 12/2017 | Macko et al. | |
| 9,836,396 B2* | 12/2017 | Wang | G06F 12/0811 |
| 9,870,339 B2* | 1/2018 | Kang | G06F 15/8061 |
| 2011/0258413 A1* | 10/2011 | Cho | G06F 9/5044 |
| | | | 712/16 |
| 2011/0285729 A1* | 11/2011 | Munshi | G06F 9/5044 |
| | | | 345/536 |
| 2013/0332702 A1* | 12/2013 | Boudier | G06F 9/3885 |
| | | | 712/28 |
| 2016/0210720 A1* | 7/2016 | Taylor | G06T 1/20 |
| 2016/0328326 A1* | 11/2016 | Di Blas | G06F 12/0833 |
| 2016/0342513 A1* | 11/2016 | Danskin | G06F 12/0811 |
| 2016/0378715 A1* | 12/2016 | Kang | G06F 13/16 |
| | | | 712/2 |

OTHER PUBLICATIONS

Architectural support for address translation on GPUs: designing memory management units for CPU/GPUs with unified address spaces; Pichai et al.; Proceedings of the 19th international conference on Architectural support for programming languages and operating systems, pp. 743-758; Mar. 1-5, 2014 (Year: 2014).*

Mapping Streaming Applications onto GPU Systems; Huynh et al.; IEEE Transactions on Parallel and Distributed Systems, vol. 25, iss. 9, pp. 2374-2385; Sep. 2014 (Year: 2014).*

International Search Report and Written Opinion—PCT/US2017/044601—ISA/EPO—dated Nov. 6, 2017.

Hestness J., et al., "GPU Computing Pipeline Inefficiencies and Optimization Opportunities in Heterogeneous CPU-GPU Processors", IISWC 15 Proceedings of the 2015 IEEE International Symposium on Workload Characterization, pp. 87-97.

* cited by examiner

MANAGING DATA FLOW IN HETEROGENEOUS COMPUTING

BACKGROUND

Heterogeneous computing leverages various kinds of computing elements to accelerate applications. In domains such as computer vision and machine learning, it is a common practice to pipeline computations across multiple stages. From the perspective of data flow, input/output (I/O) pipelining is commonly encountered to transfer computational results from one stage to another, e.g., output of operation A is used as an input of operation B. At each stage, each operation can be expressed by multiple kernel functions, in which each function represents a series of computations performed on a specific computing element. As an example, a memory location may be modified by a central processing unit (CPU) function at the first stage, and used as an input for a graphics processing unit (GPU) function at the second stage. The existing heterogeneous computing runtime has no knowledge of the data flow between stages. Thus, unnecessary data is copied back and forth between memory devices for use by various computing elements. In addition, the existing data synchronization mechanism between a host and a computing element is rigid in the sense that a host memory is always involved.

SUMMARY

Various embodiments may include apparatuses and methods for implementing data flow management on a computing device. Various embodiments may include initializing a buffer partition of a first memory of a first heterogeneous processing device for an output of execution of a first iteration of a first operation by the first heterogeneous processing device on which a first iteration of a second operation assigned for execution by a second heterogeneous processing device depends, identifying a memory management operation for transmitting the output by the first heterogeneous processing device from the buffer partition as an input to the second heterogeneous processing device, and allocating a second memory for storing data for an iteration executed by a third heterogeneous processing device to minimize a number of memory management operations for the allocated second memory.

Various embodiments may further include identifying a dependency between the first iteration of the first operation assigned for execution by the first heterogeneous processing device and the first iteration of the second operation assigned for execution by the second heterogeneous processing device, and mapping a path of iteration executions by the first heterogeneous processing device and the second heterogeneous processing device.

Various embodiments may further include determining whether a dependency between the first iteration of the first operation assigned for execution by the first heterogeneous processing device and the first iteration of the second operation assigned for execution by the second heterogeneous processing device crosses a boundary between different types of heterogeneous processing devices. In various embodiments, initializing a buffer partition may include initializing the buffer partition in response to determining that the dependency crosses a boundary between different types of heterogeneous processing devices and saving the memory management operation for transmitting the output by the first heterogeneous processing device from the buffer partition as an input to the second heterogeneous processing device in response to determining that the dependency does not cross a boundary between different types of heterogeneous processing devices.

Various embodiments may further include identifying the first heterogeneous processing device assigned to execute the first iteration of the first operation and the second heterogeneous processing device assigned to execute the first iteration of the second operation dependent on execution of the first iteration of the first operation, and determining whether the buffer partition is initialized in the first memory for the dependency of the first iteration of the second operation assigned for execution by the second heterogeneous processing device. In various embodiments, identifying a memory management operation for transmitting the output may include identifying the memory management operation for transmitting the output in response to determining that the buffer partition is initialized in the first memory.

Various embodiments may further include retrieving data from the buffer partition of the first memory by accessing the buffer partition directly by the first heterogeneous processing device bypassing a host memory.

Various embodiments may further include mapping a first memory address of the buffer partition of the first memory directly to a second memory address of a third memory of the second heterogeneous processing device without synching to a memory address of a host memory in between.

In various embodiments, identifying a memory management operation for transmitting the output may include applying one of predefined rules, an algorithm, historical data, a statistical calculation, or a heuristic.

In various embodiments, the memory management operation may include one of a copy memory management operation, a map memory management operation, an unmap memory management operation, or a no memory management operation.

Further embodiments include a computing device having a plurality of heterogeneous processing devices, a plurality of memories, an interconnect, and the heterogeneous processing devices configured to perform operations of the methods summarized above. Further aspects include a computing device having means for performing functions of the methods summarized above. Further aspects include a non-transitory processor-readable storage medium having stored thereon processor-executable instructions configure to cause a processing device of a computing device to perform operations of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
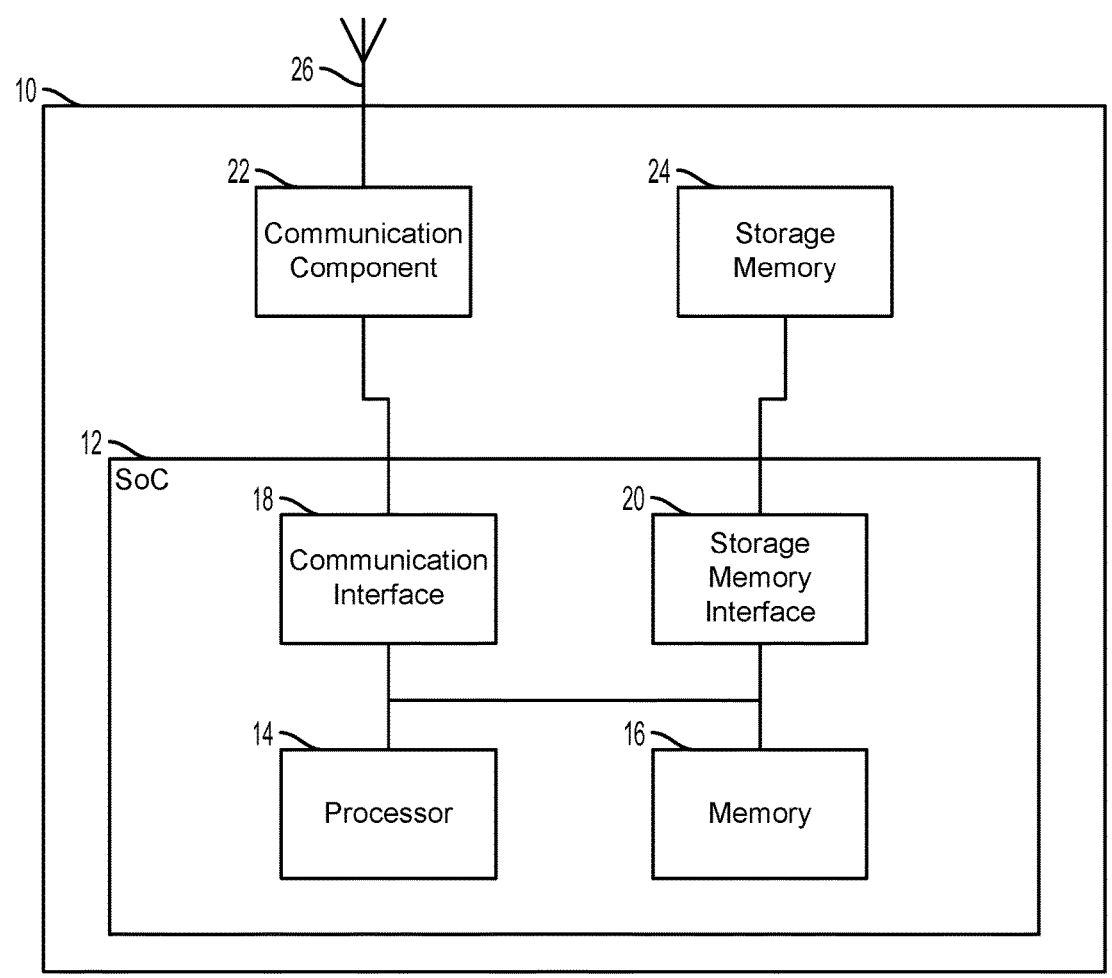
FIG. 1 is a component block diagram illustrating a computing device suitable for implementing an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments may include methods, and systems, and devices implementing such methods for managing data flow in heterogeneous computing devices by considering multiple declared operations for a program when allocating memory for the operations to execute across heterogeneous processing devices. The apparatus and methods of the various embodiments may include mapping data flow for the declared operations between heterogeneous processing devices, determining the data placement at the beginning of the computation, allocating memory for the data to reduce the need for memory management operations, including data synchronization operations, and creating buffer partitions for the data that needs to be synchronized for use between heterogeneous processing devices.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers, servers, home theater computers, and game consoles.

Heterogeneous computing uses stream processing using multiple types of heterogeneous processing devices (e.g., a central processing unit (CPU) and hardware accelerators, including a graphics processing unit (GPU), a digital signal processor (DSP), etc.) to execute computations. A computation may be a common operation implemented by multiple device-specific kernels. Multiple heterogeneous processing devices may be configured to execute a computation on a data set. Outputs of a stage of execution of the computation by a heterogeneous processing device may be passed as an input to a same or different type of heterogeneous processing device. The data set and outputs may be divided into data partitions at each stage of the computation and dispatched to privatized memories of the heterogeneous processing devices. Partitions of the data set may be preprogrammed, the data dependencies between stages may be known, and runtime tracking of iteration outputs fed as iteration inputs may be implemented using identity mapping to buffers (e.g., iteration i writes to buffer entry i) and continuous but disjoint buffer locations (e.g., an output for a first operation may write to contiguous buffer locations and a second operation may write to contiguous buffer locations disjoint from the contiguous buffer locations written to by the first operation).

At runtime, a heterogeneous computing device may generate a data flow (e.g., a graph) of the data dependencies for executing declared operations. From the data flow, the computing device may determine memory allocations for the data partitions at any stage to reduce the number of memory management operations, including data synchronization operations, necessary to pass data based on the data dependencies between the same and/or different types of heterogeneous processing devices. Generating the data flow may be implemented at any time before or during execution, and may be implemented for individual operations and/or for multiple operations.

From the data flow, at runtime, data dependencies that might require memory management operations, including data synchronization operations, for a heterogeneous processing device to access a data output from a prior operation may be identified. At runtime, data partitions at each stage may be compared. The heterogeneous computing device may create a buffer partition for each data partition to be accessed by a different type of heterogeneous processing device from the type of heterogeneous processing device generating the output data for the data partition. The creation of the buffer partitions may be based on various combinations of heterogeneous processing devices for which data synchronization operations may be implemented when a heterogeneous processing device cannot directly access the memory in which the data output is stored. To avoid executing data synchronization operations for whole data outputs when data synchronization operations are only necessary for portions of the data output, the heterogeneous computing device may use the buffer partitions to store portions of output data for which data synchronization operations are necessary. Data synchronization operations may be executed for the portion of output data stored in the buffer partition rather than the whole output data.

A buffer partition algorithm may be implemented for each buffer partition to determine what, if any, data synchronization operation is to be implemented for the output data stored in the buffer partition. The outcome of algorithm may depend on the types of heterogeneous processing devices executing the operations before writing to the buffer partition and after reading from the buffer partition. Based on the types of heterogeneous processing devices an appropriate data synchronization operation may be selected for accessing the buffer partition.

To reduce the memory management operations, including data synchronization operations, at runtime, memory for data partitions that is accessible by multiple different types of heterogeneous processing devices may be allocated so that memory management operations are not needed for accessing the data by the heterogeneous processing devices. For example, in general a GPU may use a privatized memory not accessible by other heterogeneous processing devices, and data output by the GPU may have to be synchronized with a host memory of the CPU for the data to be used by a heterogeneous processing device. For use of the output data by the GPU, the heterogeneous computing device may allocate a portion of a memory accessible by the GPU to store outputs of the GPU for later access by the GPU. Therefore, when an operation executing on the GPU depends on data output by an operation executed by the GPU, the GPU may access the data stored on the allocated portion of the privatized GPU memory and no data synchronization operations need to be conducted for the CPU host memory for the GPU to access the output data. For use of the output data by a DSP, the heterogeneous computing device may allocate a portion of a memory accessible by the GPU to store outputs of the GPU and a portion of a memory accessible by the DSP that may be directly mapped for access of the output data by the DSP. Therefore, when an operation executing on the DSP depends on data output by an operation executed by the GPU, the DSP may access the data stored on the allocated portion of the DSP memory mapped from the GPU memory and no data synchronization operations need to be conducted for the CPU host memory and copied to the DSP memory for the DSP to access the output data.

A memory allocation algorithm may allocate memory for the data partitions based on being at the beginning stage of the data flow and knowing the transitions between heterogeneous processing devices at each stage of the data flow. As noted herein, the data flow may be generated at any point, so the beginning of the data flow does not have to coincide with the beginning operations, and may be generated numerous times throughout execution of the operations. The memory allocation algorithm may analyze the inputs to determine the memory allocations for the heterogeneous processing devices that may reduce the number of data synchronization operations needed when output data is accessed by a heterogeneous processing device different from the heterogeneous processing device generating the output data.

FIG. 1 illustrates a system including a computing device 10 suitable for use with the various embodiments. The computing device 10 may include a system-on-chip (SoC) 12 with a processor 14, a memory 16, a communication interface 18, and a storage memory interface 20. The computing device 10 may further include a communication component 22, such as a wired or wireless modem, a storage memory 24, and an antenna 26 for establishing a wireless communication link. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), an auxiliary processor, a single-core processor, and a multicore processor. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. Individual processors 14 may be multicore processors as described below with reference to FIG. 2. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16 of the SoC 12 may be a volatile or non-volatile memory configured for storing data and processor-executable code for access by the processor 14. The computing device 10 and/or SoC 12 may include one or more memories 16 configured for various purposes. One or more memories 16 may include volatile memories such as random access memory (RAM) or main memory, or cache memory. These memories 16 may be configured to temporarily hold a limited amount of data received from a data sensor or subsystem, data and/or processor-executable code instructions that are requested from non-volatile memory, loaded to the memories 16 from non-volatile memory in anticipation of future access based on a variety of factors, and/or intermediary processing data and/or processor-executable code instructions produced by the processor 14 and temporarily stored for future quick access without being stored in non-volatile memory.

The memory 16 may be configured to store data and processor-executable code, at least temporarily, that is loaded to the memory 16 from another memory device, such as another memory 16 or storage memory 24, for access by one or more of the processors 14. The data or processor-executable code loaded to the memory 16 may be loaded in response to execution of a function by the processor 14. Loading the data or processor-executable code to the memory 16 in response to execution of a function may result from a memory access request to the memory 16 that is unsuccessful, or a "miss," because the requested data or processor-executable code is not located in the memory 16. In response to a miss, a memory access request to another memory 16 or storage memory 24 may be made to load the requested data or processor-executable code from the other memory 16 or storage memory 24 to the memory device 16. Loading the data or processor-executable code to the memory 16 in response to execution of a function may result from a memory access request to another memory 16 or storage memory 24, and the data or processor-executable code may be loaded to the memory 16 for later access.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

Some or all of the components of the computing device 10 may be arranged differently and/or combined while still serving the functions of the various embodiments. The computing device 10 may not be limited to one of each of the components, and multiple instances of each component may be included in various configurations of the computing device 10.

Figure 2:
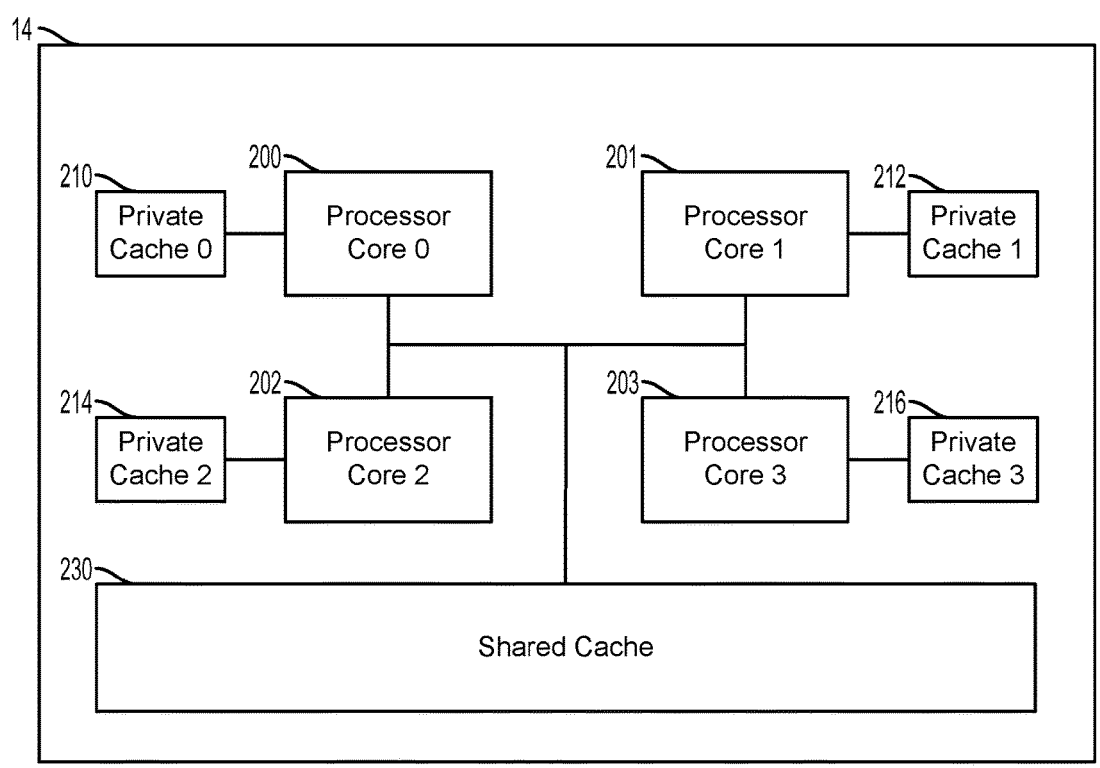
FIG. 2 is a component block diagram illustrating an example multicore processor suitable for implementing an embodiment.

FIG. 2 illustrates a multicore processor suitable for implementing an embodiment. The multicore processor 14 may include multiple processor types, including, for example, a CPU and various hardware accelerators, including for example, a GPU and/or a DSP. The multicore processor 14 may also include a custom hardware accelerator, which may include custom processing hardware and/or general purpose hardware configured to implement a specialized set of functions.

The multicore processor may have a plurality of homogeneous or heterogeneous processor cores 200, 201, 202, 203. A homogeneous multicore processor may include a plurality of homogeneous processor cores. The processor cores 200, 201, 202, 203 may be homogeneous in that, the processor cores 200, 201, 202, 203 of the multicore processor 14 may be configured for the same purpose and have the same or similar performance characteristics. For example, the multicore processor 14 may be a general purpose processor, and the processor cores 200, 201, 202, 203 may be homogeneous general purpose processor cores. The multicore processor 14 may be a GPU or a DSP, and the processor cores 200, 201, 202, 203 may be homogeneous graphics processor cores or digital signal processor cores, respectively. The multicore processor 14 may be a custom hardware accelerator with homogeneous processor cores 200, 201, 202, 203.

A heterogeneous multicore processor may include a plurality of heterogeneous processor cores. The processor cores 200, 201, 202, 203 may be heterogeneous in that the processor cores 200, 201, 202, 203 of the multicore processor 14 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar embodiments, an SoC (for example, SoC 12 of FIG. 1) may include any number of homogeneous or heterogeneous multicore processors 14. In various embodiments, not all off the processor cores 200, 201, 202, 203 need to be heterogeneous processor cores, as a heterogeneous multicore processor may include any combination of processor cores 200, 201, 202, 203 including at least one heterogeneous processor core.

Each of the processor cores 200, 201, 202, 203 of a multicore processor 14 may be designated a private cache 210, 212, 214, 216 that may be dedicated for read and/or write access by a designated processor core 200, 201, 202, 203. The private cache 210, 212, 214, 216 may store data and/or instructions, and make the stored data and/or instructions available to the processor cores 200, 201, 202, 203, to which the private cache 210, 212, 214, 216 is dedicated, for use in execution by the processor cores 200, 201, 202, 203. The private cache 210, 212, 214, 216 may include volatile memory as described herein with reference to memory 16 of FIG. 1.

The multicore processor 14 may further include a shared cache 230 that may be configured to read and/or write access by the processor cores 200, 201, 202, 203. The private cache 210, 212, 214, 216 may store data and/or instructions, and make the stored data and/or instructions available to the processor cores 200, 201, 202, 203, for use in execution by the processor cores 200, 201, 202, 203. The shared cache 230 may also function as a buffer for data and/or instructions input to and/or output from the multicore processor 14. The shared cache 230 may include volatile memory as described herein with reference to memory 16 of FIG. 1.

In the example illustrated in FIG. 2, the multicore processor 14 includes four processor cores 200, 201, 202, 203 (i.e., processor core 0, processor core 1, processor core 2, and processor core 3). In the example, each processor core 200, 201, 202, 203 is designated a respective private cache 210, 212, 214, 216 (i.e., processor core 0 and private cache 0, processor core 1 and private cache 1, processor core 2 and private cache 2, and processor core 3 and private cache 3). For ease of explanation, the examples herein may refer to the four processor cores 200, 201, 202, 203 and the four private caches 210, 212, 214, 216 illustrated in FIG. 2. However, the four processor cores 200, 201, 202, 203 and the four private caches 210, 212, 214, 216 illustrated in FIG. 2 and described herein are merely provided as an example and in no way are meant to limit the various embodiments to a four-core processor system with four designated private caches. The computing device 10, the SoC 12, or the multicore processor 14 may individually or in combination include fewer or more than the four processor cores 200, 201, 202, 203 and private caches 210, 212, 214, 216 illustrated and described herein. For ease of reference, the terms "hardware accelerator," "custom hardware accelerator," "multicore processor," "processor," and "processor core" may be used interchangeably herein.

Figure 3:
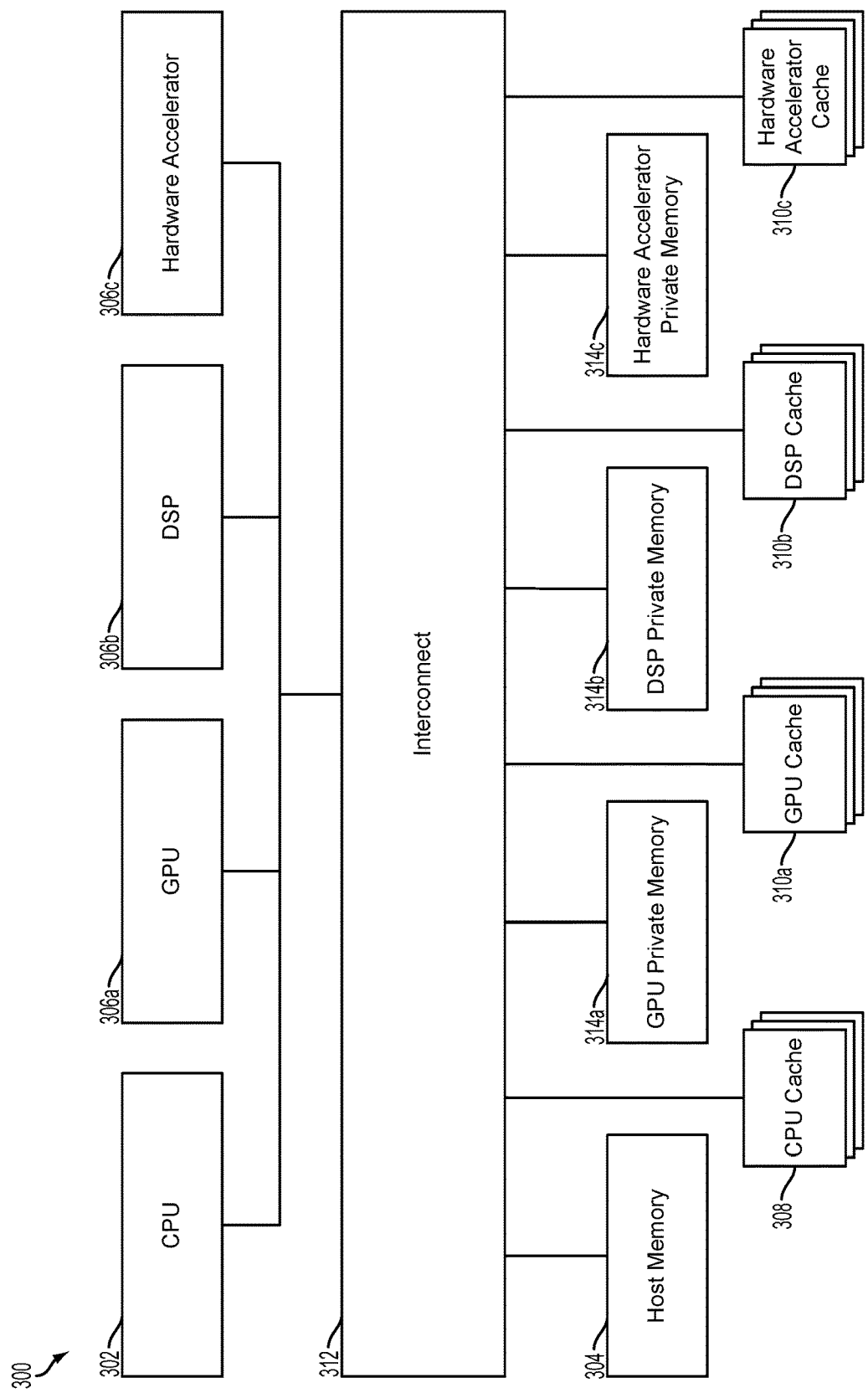
FIG. 3 is a block diagram illustrating an example heterogeneous computing device suitable for implementing an embodiment.

FIG. 3 illustrates an example embodiment of a heterogeneous computing device. A heterogeneous computing device 300 (e.g., the computing device 10 in FIG. 1) may include at least two, but up to any integer number "N" processing devices (e.g., processor 14 in FIGS. 1 and 2); for example, processing device (e.g., CPU) 302, hardware accelerator (e.g., GPU) 306a, hardware accelerator (e.g., DSP) 306b, and/or custom hardware accelerator 306c. Each processing device 302, 306a, 306b, 306c may be associated with processing device caches (e.g., private caches 210, 212, 214, 216, and/or shared cache 230 in FIG. 2). For example, the processing device 302 may be associated with a processing device cache (e.g., CPU cache) 308, the hardware accelerator 306a may be associated with a hardware accelerator cache (e.g., GPU cache) 310a, the hardware accelerator 306b may be associated with a hardware accelerator cache (e.g., DSP cache) 310b, and/or the custom hardware accelerator 306c may be associated with a custom hardware accelerator cache 310c. The processing device 302 may also be associated with a host memory 304 (e.g., memory 16, 24 in FIG. 1). Each hardware accelerator 306a, 306b, 306c may also be associated with processing device private/device specific/dedicated memory (e.g., memory 16, 24 in FIG. 1). For example, the hardware accelerator 306a may include a hardware private memory (e.g., GPU private memory) 314a, the hardware accelerator 306b may include a hardware private memory (e.g., DSP private memory) 314b, and/or the custom hardware accelerator 306c may include a custom hardware accelerator private memory 314c. As discussed herein, each of the processing devices 302, 306a, 306b, 306c may be homogenous and/or heterogeneous with respect to each other and/or among their respective processor cores (e.g., processor cores 200, 201, 202, 203 in FIG. 2).

An interconnect 312 may be communicatively connected to the processing devices 302, 306a, 306b, 306c, and any number of main memory or random access memory components, such as host memory 304, any number of hardware accelerator private memories 314a, 314b, 314c, and any number of processing device caches 308 and hardware accelerator caches 310a, 310b, 310c. In various embodiments, different combinations of the processing devices 302, 306a, 306b, 306c, may have access to one or more host memories 304, hardware accelerator private memories 314a, 314b, 314c, partitions of host memory 304 and/or partitions of hardware accelerator private memories 314a, 314b, 314c. The interconnect 312 may be configured to enable and control transmission of data between the various connected components. The interconnect 312 may be configured to transmit data between the processing devices 302, 306a, 306b, 306c so that the processing devices 302, 306a, 306b, 306c may share processing of a workload and share and/or output the results of the workload processing.

FIG. 3 illustrates non-limiting examples of a heterogeneous computing device 300. The examples illustrated and described herein, particularly with reference to those of and relating to FIG. 3, are non-limiting. The heterogeneous computing device may include any number and/or combination of processing devices, processor cores, host memories, hardware accelerator private memories, processing device caches (e.g., private caches and/or shared caches), interconnects, and connections between such components. In various embodiments, any combination of the components of a heterogeneous computing device may be distributed over multiple SoCs (e.g., SoC 12 in FIG. 1) which may be communicatively connected via the interconnect 312 or extensions of the interconnect 312.

The various embodiments described herein with reference to FIGS. 4-7 are described using example hardware components including a CPU (e.g., processor 14 in FIGS. 1 and 2, and processing device 302 in FIG. 3), a GPU (e.g., processor 14 in FIGS. 1 and 2, and hardware accelerator 306a in FIG. 3), and a DSP (e.g., processor 14 in FIGS. 1 and 2, and hardware accelerator 306b in FIG. 3). This combination of hardware components is in no way limiting to the number or type processors and/or hardware accelerators that may be included as hardware components for implementing the various embodiments described herein. The various embodiments may be implemented using any combination of two or more processors and/or hardware accelerators of different types.

Figure 4:
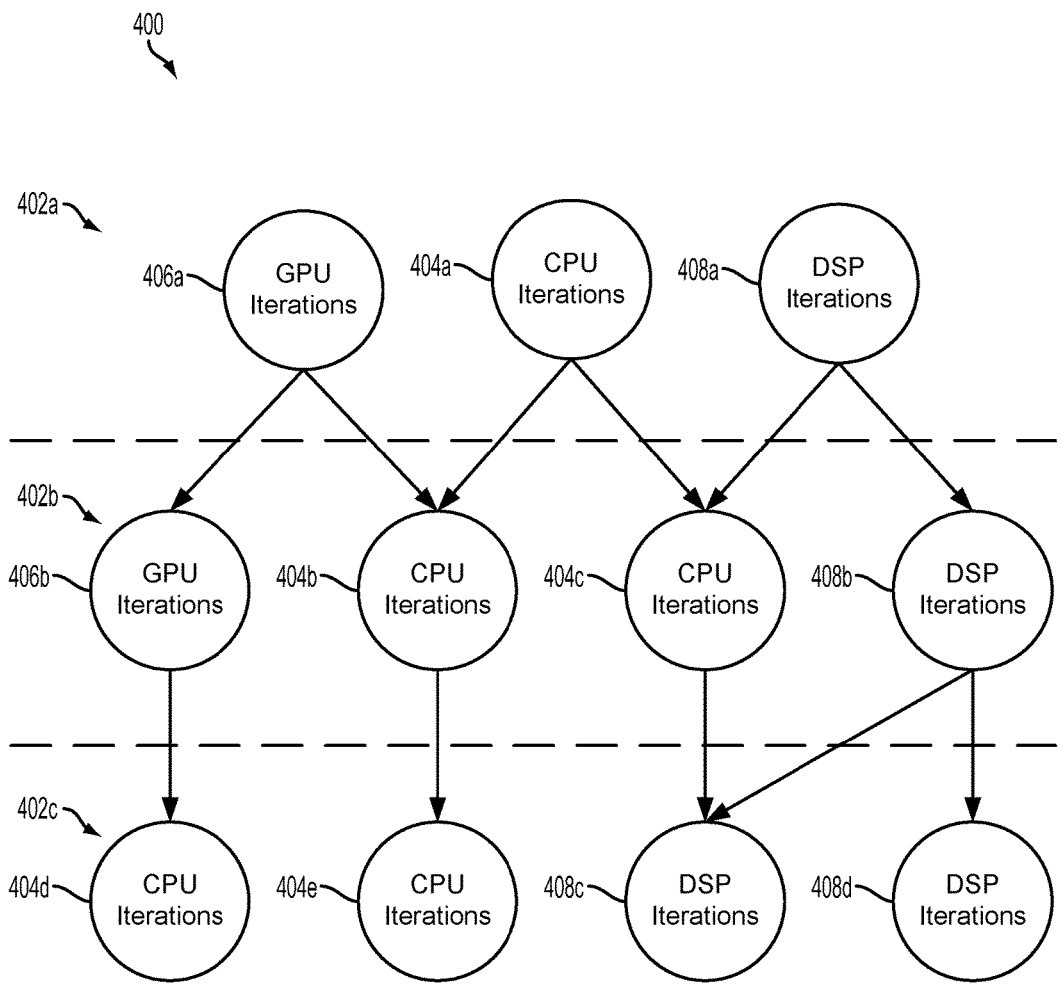
FIG. 4 is a graph diagram illustrating an example of a data flow of data dependencies for executing declared operations for implementing an embodiment.

FIG. 4 illustrates an example embodiment of a data flow 400 of data dependencies for executing declared operations 402a, 402b, 402c. To execute a declared operation 402a, 402b, 402c, iterations of the declared operation 402a, 402b, 402c, may be assigned to various processing devices (e.g., a CPU, a GPU, and a DSP). For example, a CPU may be assigned a first set of iterations (CPU iterations) 404a of a first declared operation 402a, a GPU may be assigned a first set of iterations (GPU iterations) 406a of the first declared operation 402a, and a DSP may be assigned a first set of iterations (DSP iterations) 408a of the first declared operation 402a. Each of the CPU, the GPU, and the DSP may execute their assigned iterations 404a, 406a, 408a, independently of each other. Depending on the number of iterations 404a, 406a, 408a, the complexity of the first operation 402a, and the capabilities of and/or availability of resources for the CPU, the GPU, and the DSP, times for executing the iterations 404a, 406a, 408a, may vary.

Execution of assigned iterations 404b, 404c, 406b, 408b, for a second declared operation 402b, or assigned iterations 404d, 404e, 408c, 408d, for a third declared operation 402c, may depend on completion of execution of assigned iterations 404a-404c, 406a, 406b, 408a, 408b, of a pervious declared operation 402a, 402b. FIG. 4 illustrates example dependencies of the iterations 404b, 404c, 406b, 408b, of the second declared operation 402b depending on completion of the iterations 404a, 406a, 408a, of the first declared operation 402a. The example in FIG. 4 illustrates dependencies including, a second set of GPU iterations 406b and a second set of CPU iterations 404b for the second declared operation 402b depending on completion of the first set of GPU iterations 406a; the second set of CPU iterations 404b and a third set of CPU iterations 404c for the second declared operation 402b depending on completion of the first set of CPU iterations 404a. Similarly, the third set of CPU iterations 404c and a second set of DSP iterations 408b for the second declared operation 402b depending on completion of the first set of DSP iterations 408a.

Similarly, the example in FIG. 4 illustrates example dependencies of the iterations 404d, 404e, 408c, 408d, of the third declared operation 402c depending on completion of the iterations 404b, 404c, 406b, 408b, of the second declared operation 402b. The example in FIG. 4 illustrates dependencies including, a fourth set of CPU iterations 404d for the third declared operation 402c depending on completion of the second set of GPU iterations 406b; a fifth set of CPU iterations 404e for the third declared operation 402c depending on completion of the second set of CPU iterations 404b; a third set of DSP iterations 408c for the third declared operation 402c depending on completion of the third set of CPU iterations 404c and the second set of DSP iterations 408b; and a fourth set of DSP iterations 408d for the third declared operation 402c depending on completion of the second set of DSP iterations 408b.

As shown in the example in FIG. 4 the iterations 404a-404e, 406a, 406b, 408a-408d of the various pervious declared operations 402a-402c, may depend on execution of at least one pervious set of iterations 404a-404e, 406a, 406b, 408a-408d. Execution of any pervious set of iterations 404a-404e, 406a, 406b, 408a-408d may be implemented by a processing device of a same and/or different type of processing device as the processing device assigned to execute a set of iterations 404a-404e, 406a, 406b, 408a-408d. In other words, a set of iterations 404a-404e, 406a, 406b, 408a-408d to be executed by a processing device may depend on execution of iterations 404a-404e, 406a, 406b, 408a-408d executed by a homogeneous and/or heterogeneous processing device.

A processing device (including a memory/cache monitor/controller (not shown)) may map the data flow 400 for the declared operations 402a-402c by identifying the dependencies for executing the iterations 404a-404e, 406a, 406b, 408a-408d, assigned to each processing device for the declared operations 402a-402c. As described further herein, a dependency between heterogeneous processing devices may be referred to as crossing processing device boundaries.

Figure 5:
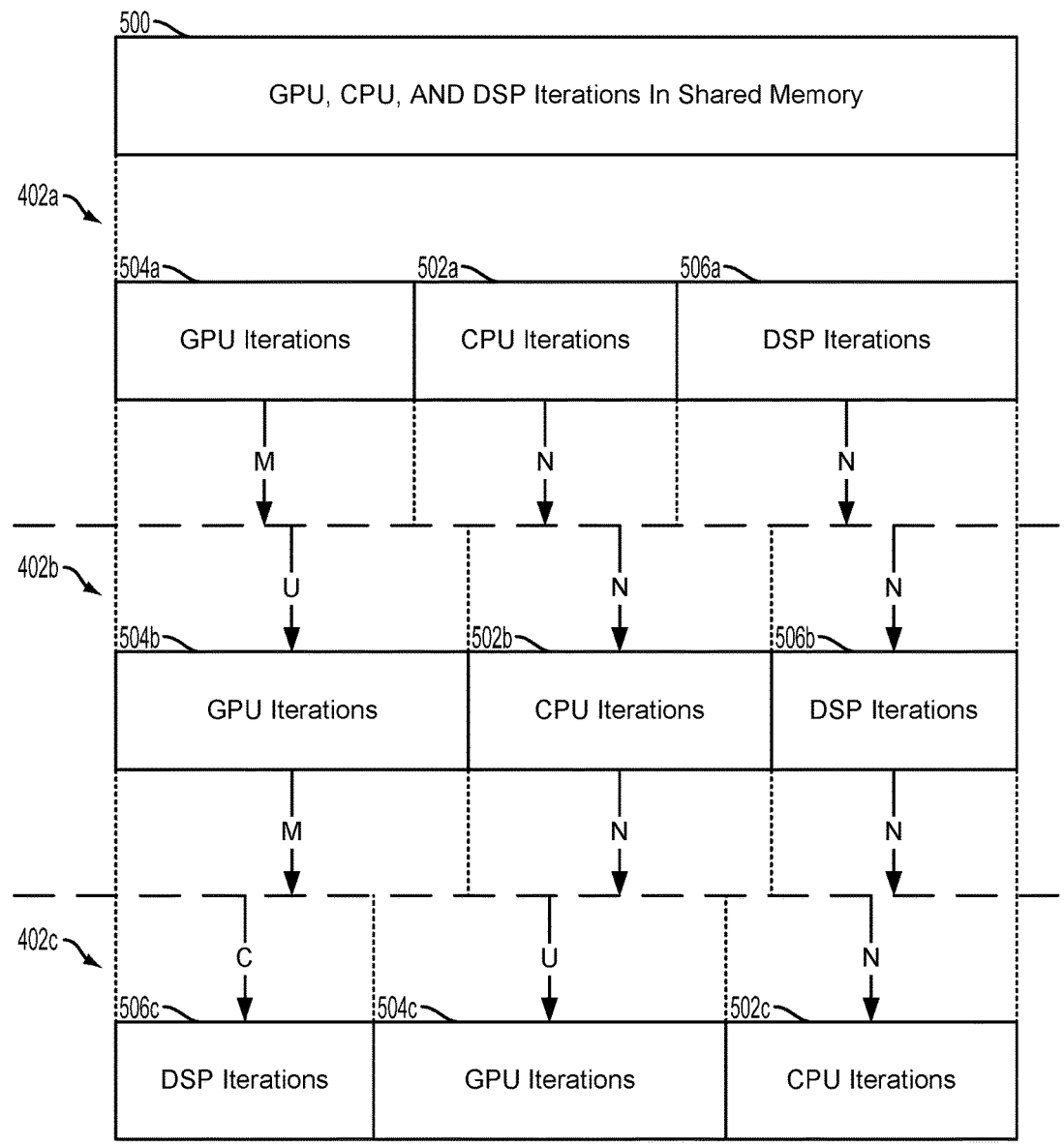
FIG. 5 is an operation execution flow diagram illustrating an example of data flow without managing data flow for implementing an embodiment.

FIG. 5 illustrates an example embodiment of data flow without managing data flow. Generally, data for implementing iterations 502a-502c, 504a-504c, 506a-506c, of declared operations 402a-402c may be stored in a memory 500 (e.g., memory 16, 24 in FIG. 1, host memory 304 in FIG. 3) accessible by the heterogeneous processing devices assigned to execute the iterations 502a-502c, 504a-504c, 506a-506c. The memory 500 may be a shared memory that is directly or indirectly accessible by the heterogeneous processing devices, and may include partitions designated for access by at least one of the processing devices. Each of the processing devices may either read from the memory and write to the memory 500 or data from the memory 500 may be copied to a private memory (e.g., private cache 210, 212, 214, 216, and shared cache 230 in FIG. 2, processing device cache 308, hardware accelerator cache 310a, 310b, 310c, hardware accelerator private memory 314a, 314b, 314c in FIG. 3) of the processing device for which the processing device has read and write access. In various embodiments, a first processing device may access the memory 500 to retrieve/read data for executing its assigned iterations 502a-502c, or access its private memory to retrieve/read data copied from the memory 500 for executing its assigned iterations 504a-504c, 506a-506c. The first processing device may also access the memory 500 to store/write data resulting from the execution of its assigned iterations 502a-502c, or access its private memory to store/write data resulting from the execution of its assigned iterations 502a-502c 504a-504c, 506a-506c.

A second processing device may also access the memory 500 to retrieve/read data for executing its assigned iterations 502a-502c, or access its private memory to retrieve/read data copied from the memory 500 for executing its assigned iterations 504a-504c, 506a-506c. In various embodiments, the data retrieved from the memory 500 or copied to and retrieved from the private memory may include data stored and/or copied to the memory 500 by the first processing device. The data retrieved from the memory 500 or copied to and retrieved from the private memory by the second processing device and the data stored and/or copied to the memory 500 by the first processing device may include data resulting from the execution of the first processing device's assigned iterations 502a-502c, 504a-504c, 506a-506c. In various embodiments, the second processing device may directly access the data stored by the first processing device on the memory 500. As such, no memory management operation ("N") may be needed for the second processing device to access the data in the memory 500 for executing its assigned iterations 502a-502c, 504a-504c, 506a-506c. In various embodiments, the second processing device may indirectly access the data stored by the first processing device on the memory 500 via the second processing device's private memory. As such, memory management operations may be required for the second processing device to access the data in the memory 500 for executing its assigned iterations 502a-502c, 504a-504c, 506a-506c. Memory management operations may be used to make data stored at a location in the memory 500 available to the second processing device by mapping ("M") and unmapping ("U") locations in the memory 500 and/or private memory accessible by the second processing device to locations of the memory 500 having the data that are not normally accessible to the second processing device. Memory management operations may be used to copy ("C") data stored at a location in the memory 500 inaccessible by the second processing device to a private memory of the second processing device.

The example in FIG. 5 illustrates various embodiments in which different memory management operations may or may not be needed for a fist, second, or third processing device to access data for executing its assigned iterations 502a-502c, 504a-504c, 506a-506c. For example, a CPU and a DSP may have direct access to shared portions of the memory 500, and no memory management operations may be required for the CPU and/or DSP to access data in the memory 500 stored by the CPU and/or DSP. Therefore, no memory management operations may be required for the CPU and/or the DSP to retrieve or store data for executing and/or resulting from execution of CPU iterations 502a-502c. Similarly, no memory management operations may be required for the CPU and/or the DSP to retrieve or store data for executing and/or resulting from execution of DSP iterations 502a and 502b. In this example the CPU and the DSP may not have direct access to shared portions of the memory 500 with a GPU and/or a GPU private memory. Therefore, for the CPU, the DSP, and/or the GPU to be able to access data stored by the GPU, and the GPU to access data stored by the CPU and/or the DSP, memory management operations may be needed to store and/or retrieve that data. For example, to store data as a result of the execution of GPU iterations 504a, 504b, to the memory, the resulting data may be mapped to accessible parts of the memory 500. To retrieve data resulting from the execution of a GPU iteration 504a, 504b, and/or a CPU iteration 502b, the data may be unmapped before the GPU executes a GPU iteration 504b, 504c. For the DSP to retrieve data resulting from the execution of a GPU iteration 504b, the data may be copied to a DSP private memory for executing a DSP iteration 506c.

Figure 6:
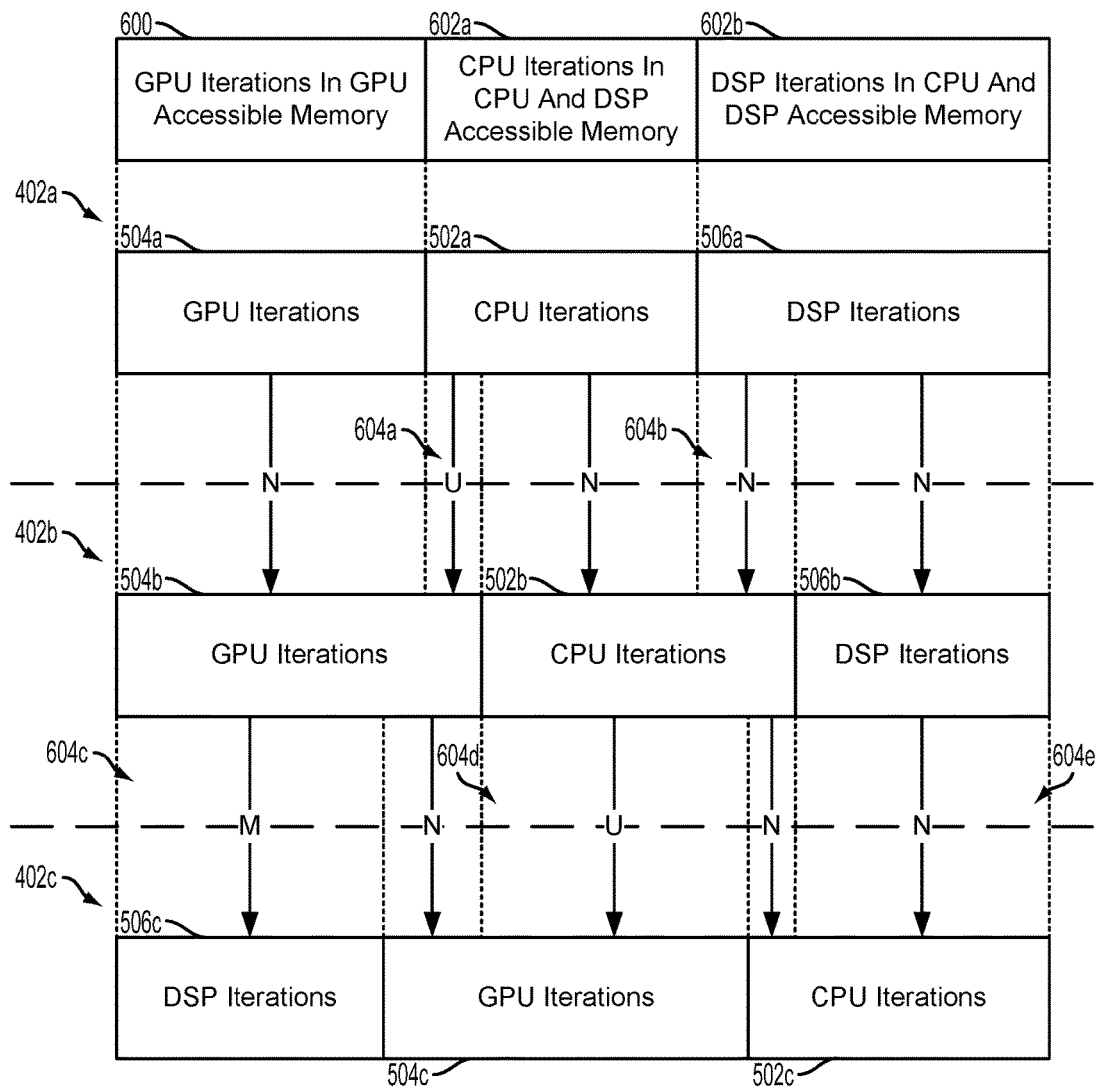
FIG. 6 is an operation execution flow diagram illustrating an example of managing data flow for implementing an embodiment.

FIG. 6 illustrates an example embodiment of managing data flow. The number of memory management operations may be reduced through implementation of buffer partitioning and memory allocation for declared operations 402a-402c. As described herein, data flow for the declared operations 402a-402c may be mapped based on dependencies between the iterations 502a-502c, 504a-504c, 506a-506c for the declared operations 402a-402c. By analyzing the data flow (e.g., data flow 400 in FIG. 4), boundary crossings between processing devices may be identified. Boundary crossings may occur when an iteration of a declared operation executed by a second processing device depends on execution of an iteration of a previous declared operation executed by a first processing device, and when the first and second processing device are heterogeneous. To help reduce the number of memory management operations, buffer partitions 604a-604e may be initialized in a memory 600, 602a, 602b (e.g., private cache 210, 212, 214, 216, and shared cache 230 in FIG. 2, host memory 304, processing device cache 308, hardware accelerator cache 310a, 310b, 310c, and hardware accelerator private memory 314a, 314b, 314c in FIG. 3) of the first processing device. The buffer partitions 604a-604e may be configured to store data resulting from execution of portions of iterations 502a, 502b, 504b, 506a, 506b, and make the data accessible to the second processing device. In various embodiments, rather than retrieving and/or storing data to the memory 500 in FIG. 5, either directly of via copy operations, for the execution of the iterations 502a-502c, 504a-504c, 506a-506c, the data may be stored to the memory of the processing device. In various embodiments, memory management for the memories of the processing devices may be implemented using common memory management techniques, such as Android Ion memory management.

Analysis of the data flow may also identify the memory management operations needed for each of the identified dependencies, including the memory management operations needed for dependencies crossing processing device boundaries. Using the information of the memory management operations, the memory 600, 602a, 602b, accessible by at least one respective processing device may be allocated to store data for executing the iterations 502a-502c, 504a-504c, 506a-506c assigned to each processing device. In various embodiments, memory management operations between the memories of the processing devices and memory allocation may determined by predefined rules, algorithms, historical data, statistical calculations, and/or heuristics.

Implementing data flow management, data for executing each iteration may be stored for each processing device in a memory 600, 602a, 602b, accessible by at least one respective processing device, and data for executing dependent iterations across processing device boundaries 502b, 502c, 504b, 504c, 506c, may be stored in buffer partitions 604a-604e separately from the remainder of the data resulting from an iteration execution. As in the example in FIG. 5, in the example in FIG. 6 no memory management operations may be required for the CPU and/or the DSP to retrieve or store data for executing and/or resulting from execution of CPU iterations 502a-502c. Similarly, no memory management operations may be required for the CPU and/or the DSP to retrieve or store data for executing and/or resulting from execution of DSP iterations 502a and 502b. With data flow management, memory management operations may no longer be required for the GPU to retrieve or store data for executing and/or resulting from execution of GPU iterations 504a, 504b, for portions of the data stored by or to be retrieved by the GPU. With data flow management, memory management operations may be required for certain processing device boundary crossing dependencies. Similar to the example illustrated in FIG. 5, in the example illustrated in FIG. 6, the CPU and DSP may be able to directly access the same memory and no memory management operations may be needed to retrieve and/or stored data from and/or to the buffer partitions 604b, 604e, for processing device boundary crossings between the CPU and the DSP. In this example, memory management operations may still be needed to retrieve and/or stored data from and/or to the buffer partitions 604a, 604c, 604d, for processing device boundary crossing between the CPU and/or the DSP, and the GPU.

Figure 7:
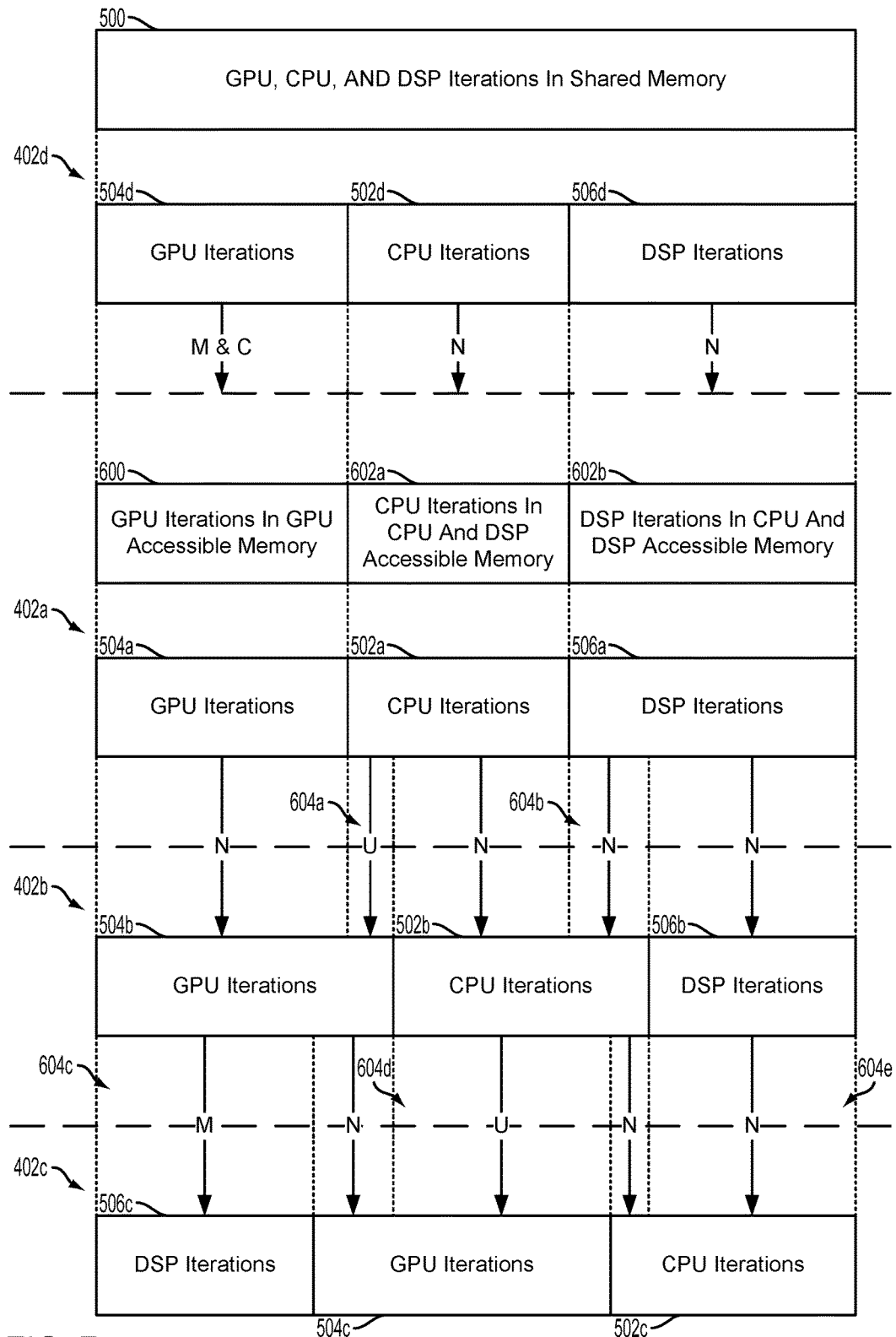
FIG. 7 is an operation execution flow diagram illustrating an example of managing data flow for implementing an embodiment.

FIG. 7 illustrates an example embodiment of managing data flow. The example in FIG. 7 illustrates that data flow management may be implemented at any point before or during execution of declared processes 402a-402d. It is not necessary that data flow management be implemented for all declared process 402a-402d. In the example illustrated in FIG. 7, data flow management is not implemented for declared process 402d, including CPU iterations 502d, GPU iterations 504d, and DSP iterations 506d. Therefore, declared process 402d is implemented in a manner similar to the description of the example in FIG. 5. After execution of the declared process 402a-402d, data flow management is implemented prior to executing declared processes 402a-402c in a manner similar to the description of the example illustrated in FIG. 6. Data flow management may be implemented for any two or more declared processes.

Figure 8A:
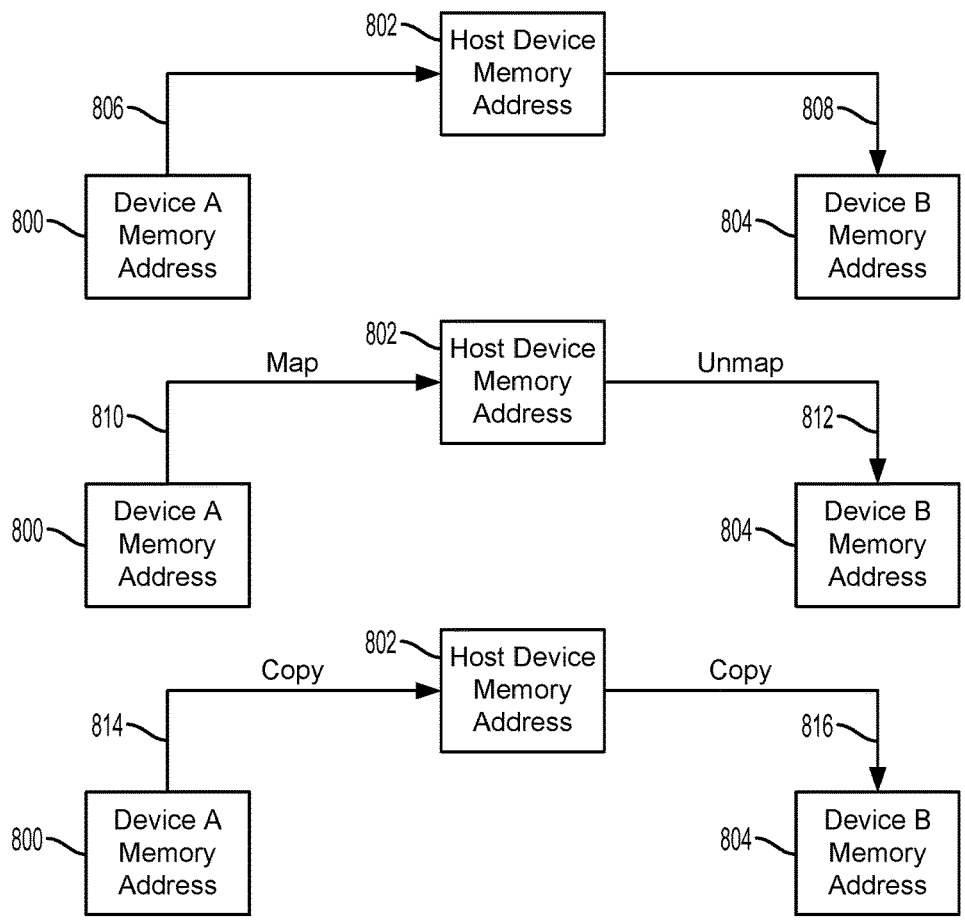
FIGS. 8A and 8B are memory management operation execution flow diagrams illustrating example memory management operations for implementing an embodiment.
Figure 8B:
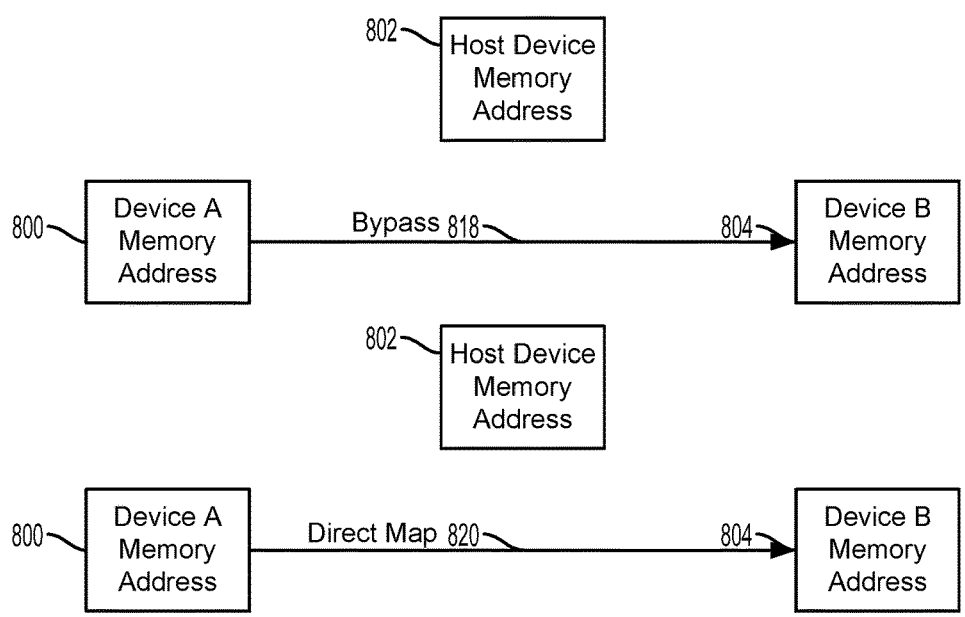

FIGS. 8A and 8B are memory management operation execution flow diagrams illustrating example memory management operations for implementing an embodiment. The memory management operations illustrated in FIG. 8A require bridging the data between the memories (e.g., private cache 210, 212, 214, 216, and shared cache 230 in FIG. 2, processing device cache 308, hardware accelerator cache 310a, 310b, 310c in FIG. 3) of the processing devices using a host memory (e.g., memory 500 in FIG. 5). For no memory management operations, data from a first memory address 800 of a first processing device memory may be written 806 to a memory address 802 of a host memory, and retrieved 808 from the memory address 802 of a host memory to be written to a second memory address 804 of a second processing device memory. For a memory access for the first processing device memory by the second processing device, map and unmap memory management operations may be required. For access to the first processing device memory, the first memory address 800 may be mapped 810 to the memory address 802 of the host memory. The second processing device may have access to the memory address 802 of the host memory and may request data from the memory address 802 mapped to the first memory address 800, and retrieve the data from the first memory address 800 by virtue of the mapping. The first memory address 800 may then be unmapped 812 from the memory address 802. For a memory access for the first processing device memory by the second processing device, copy memory management operations may be required. To copy from the first processing device memory, the data of first memory address 800 may be copied 814 to the memory address 802 of the host memory, and then copied 816 to the second memory address 804.

In various embodiments, using data flow management may obviate the need to bridge the data between the memories of the processing devices using the host memory. For no memory management operations, data retrieval from the first memory address 800 of the first processing device memory may bypass 818 the host memory, and may be directly accessed by the same first processing device. For mapping memory management operations, the first memory address 800 of the first processing device memory may map directly 820 to the second memory address 804 of the second processing device memory, without synching to the memory address 802 of the host memory in between. In various embodiments, the first memory address 800 may be an address of a buffer partition in the first processing device memory.

Figure 9:
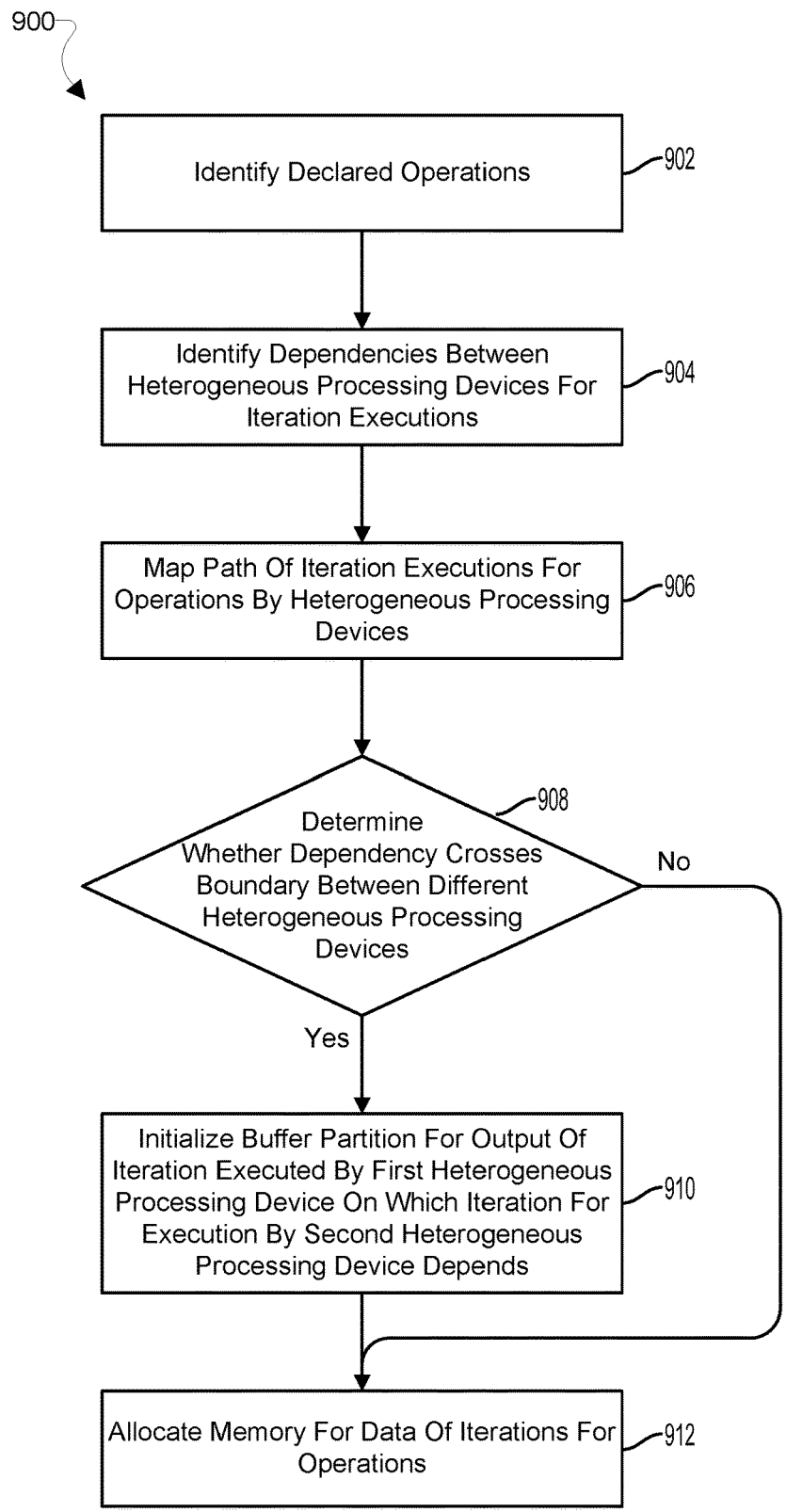
FIG. 9 is a process flow diagram illustrating a method for implementing buffer partition initialization according to an embodiment.

FIG. 9 illustrates a method 900 for implementing buffer partition initialization according to an embodiment. The method 900 may be implemented in a computing device in software executing in a processor (e.g., the processor 14 in FIGS. 1 and 2 and processing device 302 in FIG. 3), in general purpose hardware, in dedicated hardware, or in a combination of a software-configured processor and dedicated hardware, such as a processor executing software within a memory management system that includes other individual components (e.g., memory 16, 24 in FIG. 1, private cache 210, 212, 214, 216, and shared cache 230 in FIG. 2, processing device cache 308, hardware accelerator cache 310a, 310b, 310c, and host memory 304 in FIG. 3, and various memory/cache controllers (not shown). In order to encompass the alternative configurations enabled in the various embodiments, the hardware implementing the method 900 is referred to herein as a "processing device."

In block 902, the processing device may identify at least two declared operations (e.g., a first operation and a second operation). In block 904, the processing device may identify dependencies between heterogeneous processing devices for iteration executions for the declared processes. For example, the processing device may identify a dependency between a first iteration of the first operation assigned for execution by a first heterogeneous processing device and a first iteration of the second operation assigned for execution by a second heterogeneous processing device.

In block 906, the processing device may map a path of iteration executions by the heterogeneous processing devices (e.g., the first heterogeneous processing device and the second heterogeneous processing device) for each of the declared operations. The processing device may analyze the dependencies of the iterations of the declared processes assigned to the various heterogeneous processing devices for execution. The dependencies may be used to create an order of execution for the iterations which may be arranged into various representational data structures for indicating the order of execution.

In determination block 908, the processing device may determine whether a dependency of an iteration crosses a boundary between different heterogeneous processing devices. The processing device may analyze the mapped data flow to determine when execution of a first iteration of a second operation by a second heterogeneous processing device may depend on execution of a first iteration of a first operation by a first heterogeneous processing device. The processing device may identify a type of processing device for each of the first and the second heterogeneous processing device, and compare the types of each to determine whether they types are different.

In response to determining that the dependency of an iteration crosses a boundary between different heterogeneous processing devices (i.e., determination block 908="Yes"), the processing device may initialize a buffer partition for an output of an iteration of a first operation executed by a first heterogeneous processing device on which an iteration of a second operation for execution by the second heterogeneous processing device depends in block 910. For example, a buffer partition of a first memory of the first heterogeneous processing device may be initialized for the output of execution of the first iteration of the first operation by the first heterogeneous processing device on which the first iteration of the second operation assigned for execution by the second heterogeneous processing device depends. The buffer partition may be initialized on a memory (e.g., private cache 210, 212, 214, 216, and shared cache 230 in FIG. 2, processing device cache 308, hardware accelerator cache 310a, 310b, 310c in FIG. 3) of the processing device generating the output of the iteration of the first operation on which execution of the iteration of the second operation depends.

Figure 10:
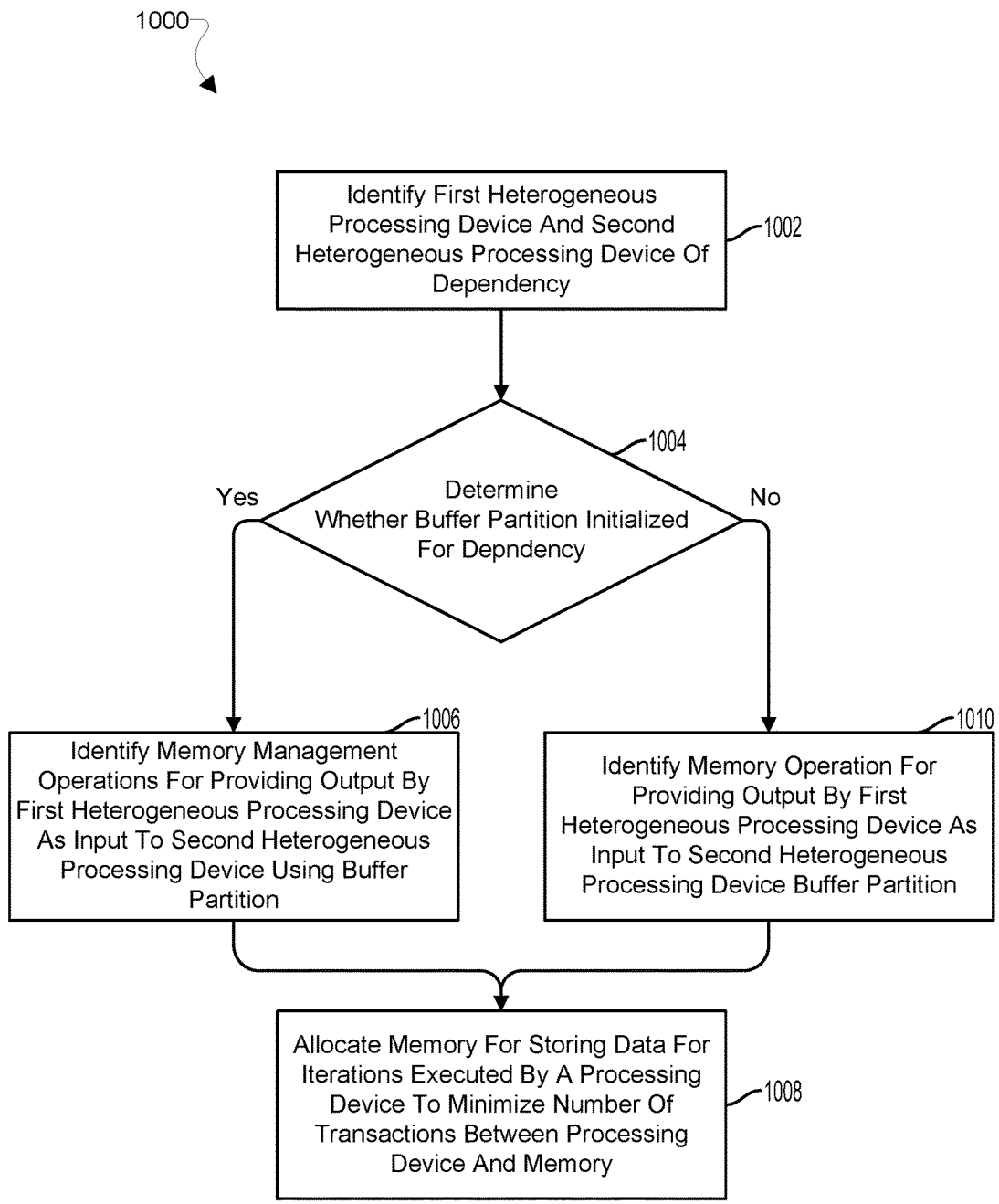
FIG. 10 is a process flow diagram illustrating a method for implementing memory allocation according to an embodiment.

In response to determining that the dependency of an iteration does not cross a boundary between different heterogeneous processing devices (i.e., determination block 908="No"), and/or following initialize the buffer partition in block 910, the processing device may allocate memory for data of iterations for operations, as described further herein with reference to the method 1000 illustrated in FIG. 10. In various embodiments, in response to determining that the dependency of an iteration does not cross a boundary between different heterogeneous processing devices (i.e., determination block 908="No"), the processing device may save the memory management operation for transmitting the output by the first heterogeneous processing device from the buffer partition as an input to the second heterogeneous processing device.

FIG. 10 illustrates a method 1000 for implementing memory allocation according to an embodiment. The method 1000 may be implemented in a computing device in software executing in a processor (e.g., the processor 14 in FIGS. 1 and 2 and processing device 302 in FIG. 3), in general purpose hardware, in dedicated hardware, or in a combination of a software-configured processor and dedicated hardware, such as a processor executing software within a memory management system that includes other individual components (e.g., memory 16, 24 in FIG. 1, private cache 210, 212, 214, 216, and shared cache 230 in FIG. 2, processing device cache 308, hardware accelerator cache 310a, 310b, 310c, and host memory 304 in FIG. 3, and various memory/cache controllers (not shown)). In order to encompass the alternative configurations enabled in the various embodiments, the hardware implementing the method 1000 is referred to herein as a "processing device." In various embodiments, the method 1000 may further describe block 912 of the method 900.

In block 1002, the processing device may identify a first heterogeneous processing device assigned to execute an iteration of a first operation and a second heterogeneous processing device assigned to execute an iteration of a second operation dependent on execution of the iteration of the first operation. The processing device may analyze the mapped data flow to determine when execution of an iteration of a second operation by a second heterogeneous processing device may depend on execution of an iteration of a first operation by a first heterogeneous processing device.

In determination block 1004, the processing device may determine whether a buffer partition is initialized in a memory (e.g., private cache 210, 212, 214, 216, and shared cache 230 in FIG. 2, processing device cache 308, hardware accelerator cache 310a, 310b, 310c in FIG. 3) of the first heterogeneous processing device for the dependency of the iteration of the second operation assigned for execution by the second heterogeneous processing device.

In response to determining that a buffer partition is initialized in a memory of the first heterogeneous processing device for the dependency of the second heterogeneous processing device (i.e., determination block 1004="Yes"), the processing device may identify memory management operations for providing or transmitting an output of execution of the iteration of the first operation by the first heterogeneous processing device from the buffer partition as an input to the second heterogeneous processing device for execution of the iteration of the second operation in block 1006. In various embodiments, the memory management operations may include a copy memory management operation, a map memory management operation, an unmap memory management operation, and/or a no memory management operation.

In response to determining that a buffer partition is not initialized in a memory of the first heterogeneous processing device for the dependency of the second heterogeneous processing device (i.e., determination block 1004="No"), the processing device may identify memory management operations for providing an output of execution of the iteration of the first operation by the first heterogeneous processing device as an input to the second heterogeneous processing device for execution of the iteration of the second operation in block 1010. In various embodiments, the processing device may apply predefined rules, algorithms, historical data, statistical calculations, and/or heuristics to identify which memory management operations will be executed to transmit data from the first heterogeneous processing devices, either from the buffer partition of the memory of the first heterogeneous processing device or via a host memory device (e.g., memory 16, 24, in FIG. 1, and host memory 304 in FIG. 3), to the second heterogeneous processing device.

Following identifying the memory management operations in either of blocks 1006 and 1010, the processing device may allocate at least one memory (e.g., memory 16, 24, in FIG. 1, private cache 210, 212, 214, 216, and shared cache 230 in FIG. 2, and host memory 304, processing device cache 308, hardware accelerator cache 310a, 310b, 310c in FIG. 3) (e.g., a second memory) for storing data for iterations executed by a third heterogeneous processing device to minimize a number of memory management operations for the allocated memory in block 1008. In various embodiments the third heterogeneous processing device may include one of the first heterogeneous processing device and the second heterogeneous processing device. In various embodiments, the processing device may apply predefined rules, algorithms, historical data, statistical calculations, and/or heuristics to identify which memory may minimize a number of transactions between a heterogeneous processing device and the allocated memory. The processing device may analyze the memory management operations for the heterogeneous processing device and select a memory to allocate based on the memory with the lowest number of transaction between the memory and the heterogeneous processing device to implement the memory management operations.

Figure 11:
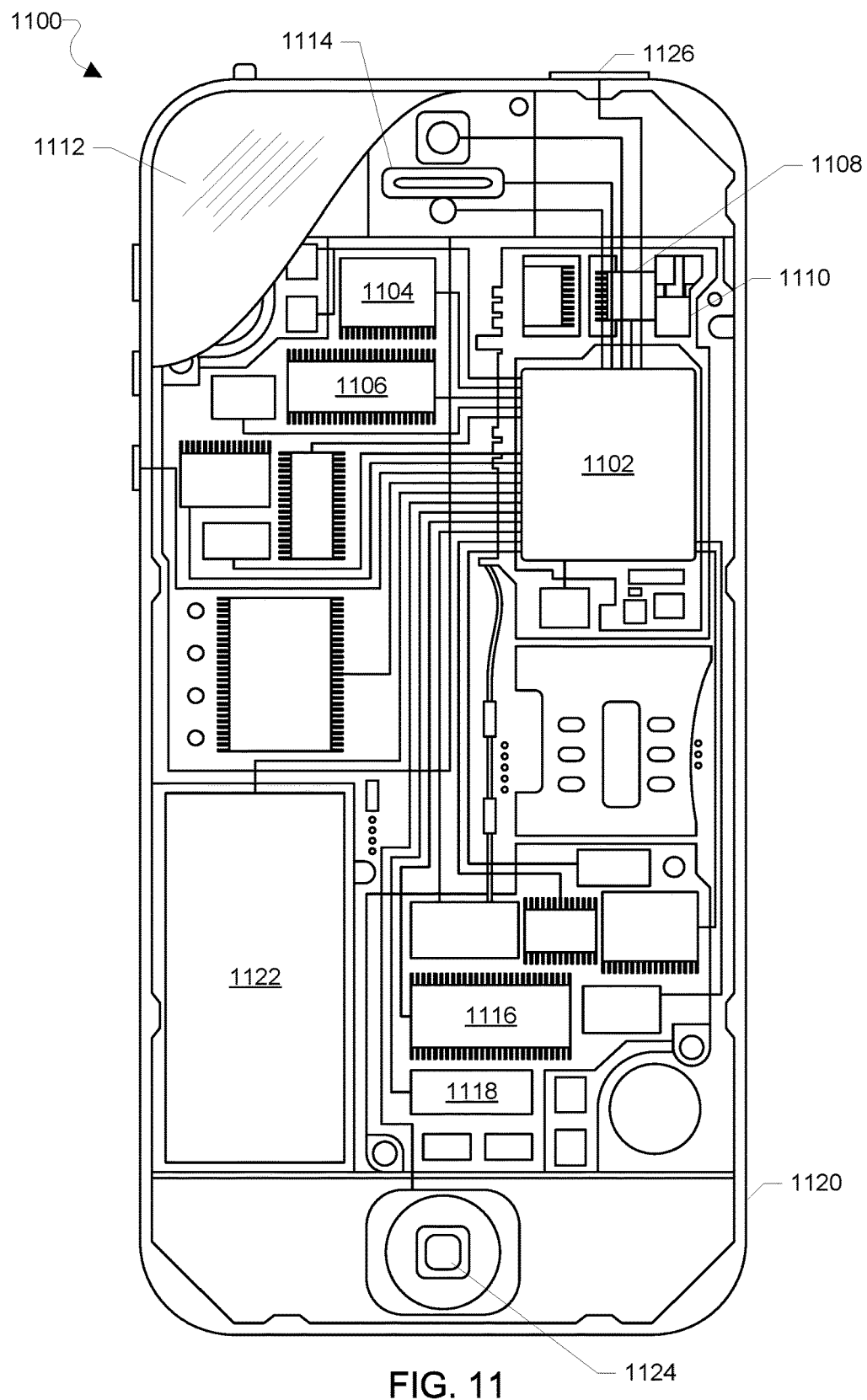
FIG. 11 is a component block diagram illustrating an example mobile computing device suitable for use with the various embodiments.

The various embodiments (including, but not limited to, embodiments described above with reference to FIGS. 1-10) may be implemented in a wide variety of computing systems including mobile computing devices, an example of which suitable for use with the various embodiments is illustrated in FIG. 11. The mobile computing device 1100 may include a processor 1102 coupled to a touchscreen controller 1104 and an internal memory 1106. The processor 1102 may be one or more multicore integrated circuits designated for general or specific processing tasks. The internal memory 1106 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1104 and the processor 1102 may also be coupled to a touchscreen panel 1112, such as a resistive-sensing touchscreen, capacitive-sensing touchscreen, infrared sensing touchscreen, etc. Additionally, the display of the computing device 1100 need not have touch screen capability.

The mobile computing device 1100 may have one or more radio signal transceivers 1108 (e.g., Peanut, Bluetooth, Zig-Bee, Wi-Fi, RF radio) and antennae 1110, for sending and receiving communications, coupled to each other and/or to the processor 1102. The transceivers 1108 and antennae 1110 may be used with the above-mentioned circuitry to implement the various wireless transmission protocol stacks and interfaces. The mobile computing device 1100 may include a cellular network wireless modem chip 1116 that enables communication via a cellular network and is coupled to the processor.

The mobile computing device 1100 may include a peripheral device connection interface 1118 coupled to the processor 1102. The peripheral device connection interface 1118 may be singularly configured to accept one type of connection, or may be configured to accept various types of physical and communication connections, common or proprietary, such as Universal Serial Bus (USB), FireWire, Thunderbolt, or PCIe. The peripheral device connection interface 1118 may also be coupled to a similarly configured peripheral device connection port (not shown).

The mobile computing device 1100 may also include speakers 1114 for providing audio outputs. The mobile computing device 1100 may also include a housing 1120, constructed of a plastic, metal, or a combination of materials, for containing all or some of the components described herein. The mobile computing device 1100 may include a power source 1122 coupled to the processor 1102, such as a disposable or rechargeable battery. The rechargeable battery may also be coupled to the peripheral device connection port to receive a charging current from a source external to the mobile computing device 1100. The mobile computing device 1100 may also include a physical button 1124 for receiving user inputs. The mobile computing device 1100 may also include a power button 1126 for turning the mobile computing device 1100 on and off.

Figure 12:
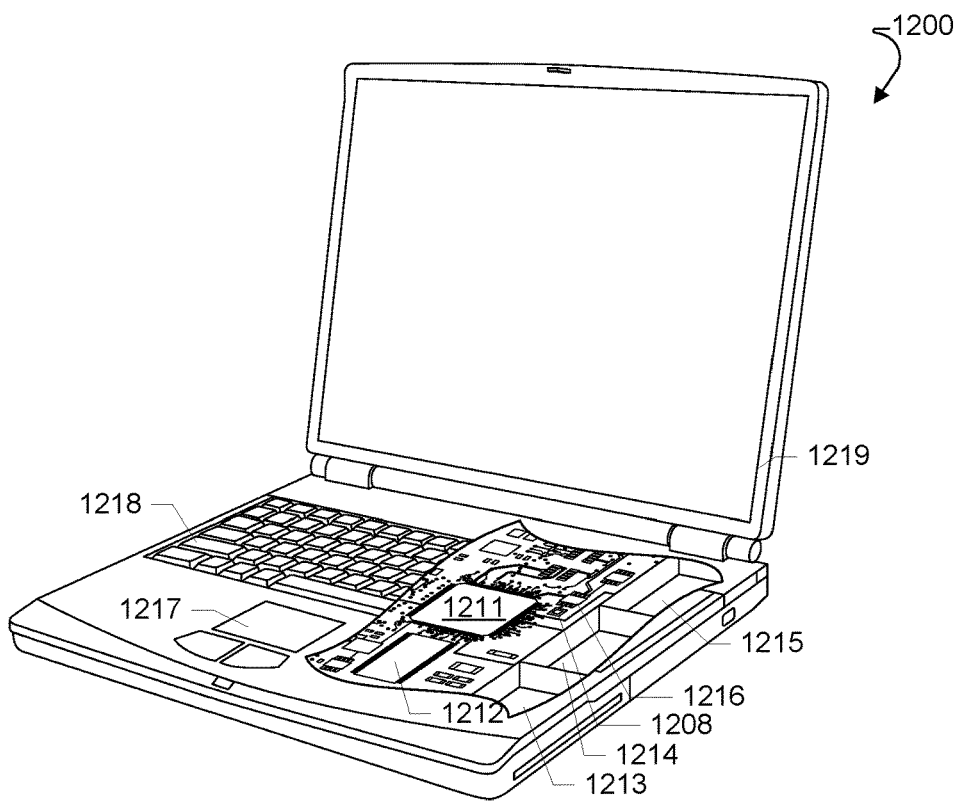
FIG. 12 is a component block diagram illustrating an example mobile computing device suitable for use with the various embodiments.

The various embodiments (including, but not limited to, embodiments described above with reference to FIGS. 1-10) may be implemented in a wide variety of computing systems include a laptop computer 1200 an example of which is illustrated in FIG. 12. Many laptop computers include a touchpad touch surface 1217 that serves as the computer's pointing device, and thus may receive drag, scroll, and flick gestures similar to those implemented on computing devices equipped with a touch screen display and described above. A laptop computer 1200 will typically include a processor 1211 coupled to volatile memory 1212 and a large capacity nonvolatile memory, such as a disk drive 1213 of Flash memory. Additionally, the computer 1200 may have one or more antenna 1208 for sending and receiving electromagnetic radiation that may be connected to a wireless data link and/or cellular telephone transceiver 1216 coupled to the processor 1211. The computer 1200 may also include a floppy disc drive 1214 and a compact disc (CD) drive 1215 coupled to the processor 1211. In a notebook configuration, the computer housing includes the touchpad 1217, the keyboard 1218, and the display 1219 all coupled to the processor 1211. Other configurations of the computing device may include a computer mouse or trackball coupled to the processor (e.g., via a USB input) as are well known, which may also be used in conjunction with the various embodiments.

Figure 13:
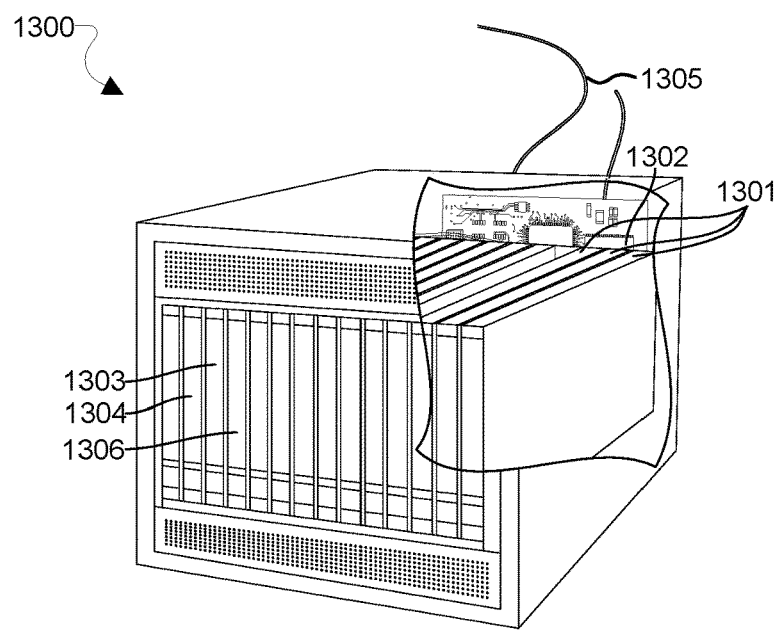
FIG. 13 is a component block diagram illustrating an example server suitable for use with the various embodiments.

The various embodiments (including, but not limited to, embodiments described above with reference to FIGS. 1-10) may also be implemented in fixed computing systems, such as any of a variety of commercially available servers. An example server 1300 is illustrated in FIG. 13. Such a server 1300 typically includes one or more multicore processor assemblies 1301 coupled to volatile memory 1302 and a large capacity nonvolatile memory, such as a disk drive 1304. As illustrated in FIG. 13, multicore processor assemblies 1301 may be added to the server 1300 by inserting them into the racks of the assembly. The server 1300 may also include a floppy disc drive, compact disc (CD) or digital versatile disc (DVD) disc drive 1306 coupled to the processor 1301. The server 1300 may also include network access ports 1303 coupled to the multicore processor assemblies 1301 for establishing network interface connections with a network 1305, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of implementing data flow management on a computing device, comprising:
    identifying a dependency between a first iteration of a first operation assigned for execution by a first heterogeneous processing device and a first iteration of a second operation assigned for execution by a second heterogeneous processing device; mapping a path of iteration executions by the first heterogeneous processing device and the second heterogeneous processing device;
    initializing a buffer partition of a first memory of the first heterogeneous processing device for an output of execution of the first iteration of the first operation by the first heterogeneous processing device on which the first iteration of the second operation assigned for execution by the second heterogeneous processing device depends;
    identifying a memory management operation for transmitting the output by the first heterogeneous processing device from the buffer partition as an input to the second heterogeneous processing device; and
    allocating a second memory for storing data for an iteration executed by a third heterogeneous processing device based on a lowest number of memory management operations between the allocated second memory and the third heterogeneous processing device.

2. The method of claim 1, further comprising determining whether the dependency between the first iteration of the first operation assigned for execution by the first heterogeneous processing device and the first iteration of the second operation assigned for execution by the second heterogeneous processing device crosses a boundary between different types of heterogeneous processing devices,
    wherein initializing a buffer partition comprises:
        initializing the buffer partition in response to determining that the dependency crosses a boundary between different types of heterogeneous processing devices; and
        saving the memory management operation for transmitting the output by the first heterogeneous processing device from the buffer partition as an input to the second heterogeneous processing device in response to determining that the dependency does not cross a boundary between different types of heterogeneous processing devices.

3. The method of claim 1, further comprising:
identifying the first heterogeneous processing device assigned to execute the first iteration of the first operation and the second heterogeneous processing device assigned to execute the first iteration of the second operation dependent on execution of the first iteration of the first operation; and
determining whether the buffer partition is initialized in the first memory for the dependency of the first iteration of the second operation assigned for execution by the second heterogeneous processing device,
wherein identifying a memory management operation for transmitting the output comprises identifying the memory management operation for transmitting the output in response to determining that the buffer partition is initialized in the first memory.

4. The method of claim 1, further comprising retrieving data from the buffer partition of the first memory by accessing the buffer partition directly by the first heterogeneous processing device bypassing a host memory.

5. The method of claim 1, further comprising mapping a first memory address of the buffer partition of the first memory directly to a second memory address of a third memory of the second heterogeneous processing device without synching to a memory address of a host memory in between.

6. The method of claim 1, wherein identifying a memory management operation for transmitting the output comprises applying one of predefined rules, an algorithm, historical data, a statistical calculation, or a heuristic.

7. The method of claim 1, wherein the memory management operation comprises one of a copy memory management operation, a map memory management operation, an unmap memory management operation, or a no memory management operation.

8. A computing device, comprising:
a plurality of heterogeneous processing devices including a first heterogeneous processing device, a second heterogeneous processing device, a third heterogeneous processing device, and a fourth heterogeneous processing device;
a plurality of memories including a first memory associated with the first heterogeneous processing device and a second memory associated with the third heterogeneous processing device; and
an interconnect coupled to the plurality of heterogeneous processing devices and the plurality of memories,
wherein the fourth heterogeneous processing device is configured to perform operations comprising:
identifying a dependency between a first iteration of a first operation assigned for execution by the first heterogeneous processing device and a first iteration of a second operation assigned for execution by the second heterogeneous processing device; mapping a path of iteration executions by the first heterogeneous processing device and the second heterogeneous processing device;
initializing a buffer partition of the first memory for an output of execution of the first iteration of the first operation by the first heterogeneous processing device on which the first iteration of the second operation assigned for execution by the second heterogeneous processing device depends;
identifying a memory management operation for transmitting the output by the first heterogeneous processing device from the buffer partition as an input to the second heterogeneous processing device; and
allocating the second memory for storing data for an iteration executed by the third heterogeneous processing device based on a lowest number of memory management operations between the allocated second memory and the third heterogeneous processing device.

9. The computing device of claim 8, wherein the fourth heterogeneous processing device is configured to perform operations further comprising determining whether the dependency between the first iteration of the first operation assigned for execution by the first heterogeneous processing device and the first iteration of the second operation assigned for execution by the second heterogeneous processing device crosses a boundary between different types of heterogeneous processing devices,
wherein the fourth heterogeneous processing device is configured to perform operations such that initializing a buffer partition comprises:
initializing the buffer partition in response to determining that the dependency crosses a boundary between different types of heterogeneous processing devices; and
saving the memory management operation for transmitting the output by the first heterogeneous processing device from the buffer partition as an input to the second heterogeneous processing device in response to determining that the dependency does not cross a boundary between different types of heterogeneous processing devices.

10. The computing device of claim 8, wherein the fourth heterogeneous processing device is configured to perform operations further comprising:
identifying the first heterogeneous processing device assigned to execute the first iteration of the first operation and the second heterogeneous processing device assigned to execute the first iteration of the second operation dependent on execution of the first iteration of the first operation; and
determining whether the buffer partition is initialized in the first memory for the dependency of the first iteration of the second operation assigned for execution by the second heterogeneous processing device,
wherein identifying a memory management operation for transmitting the output comprises identifying the memory management operation for transmitting the output in response to determining that the buffer partition is initialized in the first memory.

11. The computing device of claim 8, further comprising a host memory coupled to the interconnect,
wherein the first heterogeneous processing device is configured to perform operations further comprising retrieving data from the buffer partition of the first memory directly by accessing the buffer partition and bypassing the host memory.

12. The computing device of claim 8, further comprising:
a third memory associated with the second heterogeneous processing device and coupled to the interconnect; and
a host memory coupled to the interconnect,
wherein the fourth heterogeneous processing device is configured to perform operations further comprising mapping a first memory address of the buffer partition of the first memory directly to a second memory address of the third memory without synching to a memory address of the host memory in between.

13. The computing device of claim 8, wherein the fourth heterogeneous processing device is configured to perform operations such that identifying a memory management operation for transmitting the output comprises applying one of predefined rules, an algorithm, historical data, a statistical calculation, or a heuristic.

14. The computing device of claim 8, wherein the memory management operation comprises one of a copy memory management operation, a map memory management operation, an unmap memory management operation, or a no memory management operation.

15. A computing device, comprising:
   a plurality of heterogeneous processing devices including a first heterogeneous processing device, a second heterogeneous processing device, and a third heterogeneous processing device, and a fourth heterogeneous processing device;
   a plurality of memories including a first memory associated with the first heterogeneous processing device and a second memory associated with the third heterogeneous processing device;
   means for identifying a dependency between a first iteration of a first operation assigned for execution by the first heterogeneous processing device and a first iteration of a second operation assigned for execution by the second heterogeneous processing device; means for mapping a path of iteration executions by the first heterogeneous processing device and the second heterogeneous processing device;
   means for initializing a buffer partition of the first memory for an output of execution of the first iteration of the first operation by the first heterogeneous processing device on which the first iteration of the second operation assigned for execution by the second heterogeneous processing device depends;
   means for identifying a memory management operation for transmitting the output by the first heterogeneous processing device from the buffer partition as an input to the second heterogeneous processing device; and
   means for allocating the second memory for storing data for an iteration executed by the third heterogeneous processing device based on a lowest number of memory management operations between the allocated second memory and the third heterogeneous processing device.

16. The computing device of claim 15, further comprising means for determining whether the dependency between the first iteration of the first operation assigned for execution by the first heterogeneous processing device and the first iteration of the second operation assigned for execution by the second heterogeneous processing device crosses a boundary between different types of heterogeneous processing devices,
   wherein means for initializing a buffer partition comprises:
      means for initializing the buffer partition in response to determining that the dependency crosses a boundary between different types of heterogeneous processing devices; and
      means for saving the memory management operation for transmitting the output by the first heterogeneous processing device from the buffer partition as an input to the second heterogeneous processing device in response to determining that the dependency does not cross a boundary between different types of heterogeneous processing devices.

17. The computing device of claim 15, further comprising:
   means for identifying the first heterogeneous processing device assigned to execute the first iteration of the first operation and the second heterogeneous processing device assigned to execute the first iteration of the second operation dependent on execution of the first iteration of the first operation; and
   means for determining whether the buffer partition is initialized in the first memory for the dependency of the first iteration of the second operation assigned for execution by the second heterogeneous processing device,
   wherein means for identifying a memory management operation for transmitting the output comprises means for identifying the memory management operation for transmitting the output in response to determining that the buffer partition is initialized in the first memory.

18. The computing device of claim 15, further comprising:
   a host memory; and
   means for retrieving data from the buffer partition of the first memory directly by accessing the buffer partition and bypassing the host memory.

19. The computing device of claim 15, further comprising
   a third memory associated with the second heterogeneous processing device;
   a host memory; and
   means for mapping a first memory address of the buffer partition of the first memory directly to a second memory address of the third memory without synching to a memory address of the host memory in between.

20. The computing device of claim 15, wherein:
   means for identifying a memory management operation for transmitting the output comprises means for applying one of predefined rules, an algorithm, historical data, a statistical calculation, or a heuristic; and
   the memory management operation comprises one of a copy memory management operation, a map memory management operation, an unmap memory management operation, or a no memory management operation.

21. A non-transitory processor-readable medium having stored thereon processor-executable instructions configured to cause a processing device of a computing device to perform operations comprising:
   identifying a dependency between a first iteration of a first operation assigned for execution by a first heterogeneous processing device and a first iteration of a second operation assigned for execution by a second heterogeneous processing device; mapping a path of iteration executions by the first heterogeneous processing device and the second heterogeneous processing device;
   initializing a buffer partition of a first memory of the first heterogeneous processing device for an output of execution of the first iteration of the first operation by the first heterogeneous processing device on which the first iteration of the second operation assigned for execution by the second heterogeneous processing device depends;
   identifying a memory management operation for transmitting the output by the first heterogeneous processing device from the buffer partition as an input to the second heterogeneous processing device; and
   allocating a second memory for storing data for an iteration executed by a third heterogeneous processing device based on a lowest number of memory management operations between the allocated second memory and the third heterogeneous processing device.

22. The non-transitory processor-readable medium of claim 21, wherein the stored executable instructions are configured to cause the processing device of the computing device to perform operations further comprising determining whether the dependency between the first iteration of the first operation assigned for execution by the first heterogeneous processing device and the first iteration of the second operation assigned for execution by the second heterogeneous processing device crosses a boundary between different types of heterogeneous processing devices, wherein the stored executable instructions are configured to cause the processing device of the computing device to perform operations such that initializing a buffer partition comprises:

initializing the buffer partition in response to determining that the dependency crosses a boundary between different types of heterogeneous processing devices; and saving the memory management operation for transmitting the output by the first heterogeneous processing device from the buffer partition as an input to the second heterogeneous processing device in response to determining that the dependency does not cross a boundary between different types of heterogeneous processing devices.

23. The non-transitory processor-readable medium of claim 21, wherein the stored executable instructions are configured to cause the processing device of the computing device to perform operations further comprising:

identifying the first heterogeneous processing device assigned to execute the first iteration of the first operation and the second heterogeneous processing device assigned to execute the first iteration of the second operation dependent on execution of the first iteration of the first operation; and determining whether the buffer partition is initialized in the first memory for the dependency of the first iteration of the second operation assigned for execution by the second heterogeneous processing device, wherein identifying a memory management operation for transmitting the output comprises identifying the memory management operation for transmitting the output in response to determining that the buffer partition is initialized in the first memory.

24. The non-transitory processor-readable medium of claim 21, wherein the stored executable instructions are configured to cause the processing device of the computing device to perform operations further comprising retrieving data from the buffer partition of the first memory by accessing the buffer partition directly by the first heterogeneous processing device bypassing a host memory.

25. The non-transitory processor-readable medium of claim 21, wherein the stored executable instructions are configured to cause the processing device of the computing device to perform operations further comprising mapping a first memory address of the buffer partition of the first memory directly to a second memory address of a third memory of the second heterogeneous processing device without synching to a memory address of a host memory in between.

26. The non-transitory processor-readable medium of claim 21, wherein:

the memory management operation comprises one of a copy memory management operation, a map memory management operation, an unmap memory management operation, or a no memory management operation; and the stored executable instructions are configured to cause the processing device of the computing device to perform operations such that identifying a memory management operation for transmitting the output comprises applying one of predefined rules, an algorithm, historical data, a statistical calculation, or a heuristic.

* * * * *